(12) United States Patent
Park et al.

(10) Patent No.: US 7,936,649 B2
(45) Date of Patent: May 3, 2011

(54) METHOD OF MANAGING OVERWRITE AND METHOD OF RECORDING MANAGEMENT INFORMATION ON AN OPTICAL DISC WRITE ONCE

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 12/607,588

(22) Filed: Oct. 28, 2009

(65) Prior Publication Data

US 2010/0046335 A1 Feb. 25, 2010

Related U.S. Application Data

(63) Continuation of application No. 10/731,170, filed on Dec. 10, 2003, now Pat. No. 7,668,054.

(30) Foreign Application Priority Data

| Dec. 11, 2002 | (KR) | ............... P2002-78889 |
| Jan. 27, 2003 | (KR) | ............... P2003-05212 |
| Feb. 17, 2003 | (KR) | ............... P2003-09893 |
| Mar. 3, 2003 | (KR) | ............... P2003-13199 |

(51) Int. Cl.
G11B 27/02 (2006.01)

(52) U.S. Cl. .................................. 369/47.13

(58) Field of Classification Search ........................ None
See application file for complete search history.

(56) References Cited

U.S. PATENT DOCUMENTS

| 3,272,671 A | 9/1966 | Gaylord et al. |
| 4,558,446 A | 12/1985 | Banba et al. |
| 4,733,386 A | 3/1988 | Shimoi et al. |
| 4,807,205 A | 2/1989 | Picard et al. |

(Continued)

FOREIGN PATENT DOCUMENTS

CN 1134017 A 10/1996

(Continued)

OTHER PUBLICATIONS

Yokozeki et al., "A Virtual Optical Disk Method to Realize Rewritability and Revision Control on a Write-Once Optical Disk" Faculty of Technology, Tokyo University of Agriculture and Technology, Koganei, Jan. 1, 1990, pp. 34-43.
"Bytes 480 to 511: Unspecified data", ECMA-238, Jun. 1996, XP-002289010.
JIS handbook data processing for hardware, Japan, Japanese Standards Association Inc., Apr. 21, 1999, pp. 1064-1070.
ECMA: "120mm DVD Rewritable Disk (DVD-RAM)" Internet Citation, pp. 43-55, XP002518235, Feb. 1, 1998.
ECMA: Standardizing Information and Communication Systems: "Standard ECMA-240: Data Interchange on 120mm Optical Disk Cartridges using Phase Change PD Format—Capacity:650Mbytes per Cartridge" Standard ECMA 240, pp. 41-53, XP002562014, Jun. 1, 1996.
Parlante "Linked List Basics", http://cslibrary.stanford.edu/103, Apr. 12, 2001.

(Continued)

*Primary Examiner* — Joseph H Feild
*Assistant Examiner* — Parul Gupta
(74) *Attorney, Agent, or Firm* — Birch, Stewart, Kolasch & Birch, LLP

(57) ABSTRACT

A device and method of reproducing and/or recording data onto a write once recording medium, the recording medium having a data area and a management area, the data area having a spare area. The recording method include: performing a replacement-recording by recording data requested to be recorded in a specified area onto a replacement area in the data area when the specified area is defective or contains data recorded thereon; and recording onto the management area a pair of consecutive entries for managing the replacement-recording when a size of the specified area corresponds to a plurality of consecutive recording-units. One of the pair of consecutive entries includes start address information of the specified area and start address information of the replacement area and another of the pair of consecutive entries includes end address information of the specified area and end address information of the replacement area.

15 Claims, 13 Drawing Sheets

U.S. PATENT DOCUMENTS

| | | | |
|---|---|---|---|
| 4,963,866 A | 10/1990 | Duncan | |
| 5,051,849 A | 9/1991 | Fukushima et al. | |
| 5,065,388 A | 11/1991 | Roth et al. | |
| 5,068,842 A | 11/1991 | Naito | |
| 5,111,444 A | 5/1992 | Fukushima et al. | |
| 5,210,734 A | 5/1993 | Sakurai et al. | |
| 5,235,585 A | 8/1993 | Bish et al. | |
| 5,237,553 A | 8/1993 | Fukushima et al. | |
| 5,243,588 A | 9/1993 | Maeda et al. | |
| 5,247,494 A | 9/1993 | Ohno et al. | |
| 5,289,450 A | 2/1994 | Mizumoto et al. | |
| 5,319,626 A | 6/1994 | Ozaki et al. | |
| 5,323,367 A | 6/1994 | Tamura et al. | |
| 5,343,456 A | 8/1994 | Maeda | |
| 5,345,433 A | 9/1994 | Ohga et al. | |
| 5,404,357 A | 4/1995 | Ito et al. | |
| 5,408,478 A | 4/1995 | Ohmori et al. | |
| 5,418,762 A | 5/1995 | Kitayama | |
| 5,418,767 A | 5/1995 | Gaudet et al. | |
| 5,442,611 A | 8/1995 | Hosaka et al. | |
| 5,448,728 A * | 9/1995 | Takano et al. | 1/1 |
| 5,475,668 A | 12/1995 | Azumatani et al. | |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,497,361 A | 3/1996 | Mita et al. | |
| 5,526,335 A | 6/1996 | Tamegai | |
| 5,528,571 A | 6/1996 | Funahashi et al. | |
| 5,553,045 A | 9/1996 | Obata et al. | |
| 5,577,194 A | 11/1996 | Wells et al. | |
| 5,608,715 A | 3/1997 | Yokogawa et al. | |
| 5,633,764 A | 5/1997 | Ohta | |
| 5,644,539 A | 7/1997 | Yamagami et al. | |
| 5,666,335 A | 9/1997 | Horibe | |
| 5,666,531 A | 9/1997 | Martin | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,820,962 A | 10/1998 | Kimura et al. | |
| 5,825,726 A | 10/1998 | Hwang et al. | |
| 5,848,038 A | 12/1998 | Igarashi et al. | |
| 5,860,088 A | 1/1999 | Benhase et al. | |
| 5,862,117 A | 1/1999 | Fuentes et al. | |
| 5,867,455 A | 2/1999 | Miyamoto et al. | |
| 5,872,750 A | 2/1999 | Satoh | |
| 5,878,020 A | 3/1999 | Takahashi | |
| 5,890,206 A | 3/1999 | Koike | |
| 5,914,928 A | 6/1999 | Takahashi et al. | |
| 5,930,815 A | 7/1999 | Estakhri et al. | |
| 5,940,702 A | 8/1999 | Sakao | |
| 5,940,854 A | 8/1999 | Green, Jr. et al. | |
| 5,966,358 A | 10/1999 | Mine | |
| 6,031,804 A | 2/2000 | Yamamuro | |
| 6,058,085 A | 5/2000 | Obata et al. | |
| 6,089,455 A | 7/2000 | Yagita | |
| 6,118,608 A | 9/2000 | Kakihara et al. | |
| 6,118,737 A | 9/2000 | Hutter | |
| 6,138,203 A | 10/2000 | Inokuchi et al. | |
| 6,160,778 A | 12/2000 | Ito et al. | |
| 6,182,240 B1 | 1/2001 | Mine | |
| 6,189,118 B1 | 2/2001 | Sasaki et al. | |
| 6,205,099 B1 | 3/2001 | Sasaki et al. | |
| 6,212,647 B1 | 4/2001 | Sims, III et al. | |
| 6,233,654 B1 | 5/2001 | Aoki et al. | |
| 6,246,829 B1 | 6/2001 | Nakagawa | |
| 6,249,884 B1 | 6/2001 | Joo | |
| 6,249,888 B1 | 6/2001 | Sasaki et al. | |
| 6,292,445 B1 * | 9/2001 | Ito et al. | 369/47.14 |
| 6,301,220 B1 | 10/2001 | Takagi et al. | |
| 6,314,078 B1 | 11/2001 | Takagi et al. | |
| 6,336,202 B1 | 1/2002 | Tsuchimoto et al. | |
| 6,341,109 B1 | 1/2002 | Kayanuma et al. | |
| 6,341,278 B1 | 1/2002 | Yamamoto et al. | |
| 6,373,800 B1 | 4/2002 | Takahashi | |
| 6,381,710 B1 | 4/2002 | Kim | |
| 6,393,513 B2 | 5/2002 | Estakhri et al. | |
| 6,405,332 B1 | 6/2002 | Bando et al. | |
| 6,414,923 B1 | 7/2002 | Park et al. | |
| 6,415,350 B2 | 7/2002 | Asoh | |
| 6,418,100 B1 | 7/2002 | Park et al. | |
| 6,447,126 B1 | 9/2002 | Hornbeck | |
| 6,466,532 B1 | 10/2002 | Ko | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,493,301 B1 | 12/2002 | Park | |
| 6,493,302 B2 | 12/2002 | Takahashi | |
| 6,496,807 B1 | 12/2002 | Inokuchi et al. | |
| 6,529,458 B1 | 3/2003 | Shin et al. | |
| 6,542,450 B1 | 4/2003 | Park | |
| 6,545,833 B1 | 4/2003 | Ee et al. | |
| 6,564,345 B1 | 5/2003 | Kim et al. | |
| 6,581,167 B1 | 6/2003 | Gotoh et al. | |
| 6,594,725 B2 | 7/2003 | Ando et al. | |
| 6,606,285 B1 | 8/2003 | Ijtsma et al. | |
| 6,615,363 B1 | 9/2003 | Fukasawa et al. | |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,243 B2 | 12/2003 | Ando et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,738,341 B2 | 5/2004 | Ohata et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 * | 7/2004 | Alexander et al. | 711/129 |
| 6,779,137 B2 | 8/2004 | Ko et al. | |
| 6,782,488 B1 | 8/2004 | Park et al. | |
| 6,785,206 B1 | 8/2004 | Lee et al. | |
| 6,785,219 B1 | 8/2004 | Sasaki et al. | |
| 6,788,631 B1 | 9/2004 | Park et al. | |
| 6,795,389 B1 | 9/2004 | Nishiuchi et al. | |
| RE38,638 E | 10/2004 | Yonemitsu et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,845,072 B1 | 1/2005 | Weirauch | |
| 6,883,111 B2 | 4/2005 | Yoshida et al. | |
| 6,892,327 B2 | 5/2005 | Ko et al. | |
| 6,918,003 B2 | 7/2005 | Sasaki et al. | |
| 6,922,802 B2 | 7/2005 | Kim et al. | |
| 6,934,236 B2 | 8/2005 | Lee et al. | |
| 6,957,360 B2 | 10/2005 | Sims, III et al. | |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,031,239 B2 | 4/2006 | Takahashi et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,171 B2 | 12/2006 | Yamawaki | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,248,541 B2 | 7/2007 | Yonezawa | |
| 7,272,086 B2 | 9/2007 | Hwang et al. | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,317,670 B2 | 1/2008 | Park | |
| 7,327,654 B2 | 2/2008 | Hwang et al. | |
| 7,337,354 B2 | 2/2008 | Yoshida et al. | |
| 7,349,301 B2 | 3/2008 | Terada et al. | |
| 7,355,934 B2 | 4/2008 | Park et al. | |

| | | |
|---|---|---|
| 7,372,788 B2 | 5/2008 | Park et al. |
| 7,372,792 B2 | 5/2008 | Park |
| 7,379,402 B2 | 5/2008 | Ko et al. |
| 7,420,909 B2 | 9/2008 | Yoshida et al. |
| 7,428,202 B2 * | 9/2008 | Takahashi et al. ......... 369/53.24 |
| 7,428,670 B2 | 9/2008 | Hwang et al. |
| 7,435,782 B2 | 10/2008 | Hashimoto et al. |
| 7,483,349 B2 | 1/2009 | Park et al. |
| 7,483,355 B2 | 1/2009 | Park |
| 7,487,387 B2 | 2/2009 | Blacquiere et al. |
| 7,533,319 B2 | 5/2009 | Hwang et al. |
| 7,613,874 B2 * | 11/2009 | Park ............................. 711/111 |
| 7,742,372 B2 | 6/2010 | Kwon et al. |
| 2001/0009537 A1 | 7/2001 | Park |
| 2001/0011267 A1 | 8/2001 | Kihara et al. |
| 2001/0014070 A1 | 8/2001 | Ando et al. |
| 2001/0020261 A1 | 9/2001 | Ando et al. |
| 2001/0021144 A1 | 9/2001 | Oshima et al. |
| 2001/0026511 A1 | 10/2001 | Ueda et al. |
| 2001/0033517 A1 | 10/2001 | Ando et al. |
| 2001/0034855 A1 | 10/2001 | Ando et al. |
| 2001/0034863 A1 | 10/2001 | Ko et al. |
| 2001/0043525 A1 | 11/2001 | Ito et al. |
| 2001/0043800 A1 | 11/2001 | Gotoh et al. |
| 2002/0025138 A1 | 2/2002 | Isobe et al. |
| 2002/0035705 A1 | 3/2002 | Ando et al. |
| 2002/0049938 A1 | 4/2002 | Ko |
| 2002/0055012 A1 | 5/2002 | Chou et al. |
| 2002/0097665 A1 | 7/2002 | Ko et al. |
| 2002/0097666 A1 | 7/2002 | Ko et al. |
| 2002/0099950 A1 | 7/2002 | Smith |
| 2002/0105868 A1 | 8/2002 | Ko |
| 2002/0133485 A1 | 9/2002 | Furuhashi |
| 2002/0136118 A1 | 9/2002 | Takahashi |
| 2002/0136134 A1 | 9/2002 | Ito et al. |
| 2002/0136537 A1 | 9/2002 | Takahashi |
| 2002/0145966 A1 | 10/2002 | Hirotsune et al. |
| 2002/0159382 A1 | 10/2002 | Ohata et al. |
| 2002/0161774 A1 | 10/2002 | Tol et al. |
| 2002/0163326 A1 | 11/2002 | Choi et al. |
| 2002/0176341 A1 | 11/2002 | Ko et al. |
| 2002/0186341 A1 | 12/2002 | Yamamura et al. |
| 2003/0072236 A1 | 4/2003 | Hirotsune et al. |
| 2003/0095482 A1 | 5/2003 | Hung et al. |
| 2003/0095484 A1 | 5/2003 | Motohashi |
| 2003/0103427 A1 | 6/2003 | Yeo et al. |
| 2003/0126527 A1 | 7/2003 | Kim et al. |
| 2003/0133369 A1 | 7/2003 | Sasaki |
| 2003/0135800 A1 | 7/2003 | Kim et al. |
| 2003/0137909 A1 | 7/2003 | Ito et al. |
| 2003/0137910 A1 | 7/2003 | Ueda et al. |
| 2003/0137913 A1 | 7/2003 | Oshima et al. |
| 2003/0142608 A1 | 7/2003 | Yamamoto et al. |
| 2003/0149918 A1 | 8/2003 | Takaichi |
| 2003/0156471 A1 | 8/2003 | Ueda et al. |
| 2003/0173669 A1 | 9/2003 | Shau |
| 2003/0179669 A1 | 9/2003 | Takahashi et al. |
| 2003/0198155 A1 | 10/2003 | Go et al. |
| 2003/0237024 A1 | 12/2003 | Ogawa et al. |
| 2004/0001408 A1 | 1/2004 | Propps et al. |
| 2004/0004917 A1 | 1/2004 | Lee |
| 2004/0042363 A1 | 3/2004 | Kobayashi et al. |
| 2004/0047616 A1 | 3/2004 | Uchiumi et al. |
| 2004/0057363 A1 | 3/2004 | Tsukihashi et al. |
| 2004/0062159 A1 | 4/2004 | Park et al. |
| 2004/0062160 A1 | 4/2004 | Park et al. |
| 2004/0076084 A1 | 4/2004 | Yonezowa |
| 2004/0076096 A1 | 4/2004 | Hwang et al. |
| 2004/0090888 A1 | 5/2004 | Park et al. |
| 2004/0105363 A1 | 6/2004 | Ko et al. |
| 2004/0114474 A1 | 6/2004 | Park et al. |
| 2004/0120233 A1 | 6/2004 | Park et al. |
| 2004/0125716 A1 | 7/2004 | Ko et al. |
| 2004/0125717 A1 | 7/2004 | Ko et al. |
| 2004/0136292 A1 | 7/2004 | Park et al. |
| 2004/0145980 A1 | 7/2004 | Park et al. |
| 2004/0158768 A1 | 8/2004 | Park et al. |
| 2004/0160799 A1 | 8/2004 | Park et al. |
| 2004/0165495 A1 | 8/2004 | Park et al. |
| 2004/0170101 A1 | 9/2004 | Nakajo |
| 2004/0174782 A1 | 9/2004 | Lee et al. |
| 2004/0174785 A1 | 9/2004 | Ueda et al. |
| 2004/0179445 A1 | 9/2004 | Park et al. |
| 2004/0179458 A1 | 9/2004 | Hwang et al. |
| 2004/0193946 A1 | 9/2004 | Park et al. |
| 2004/0218488 A1 | 11/2004 | Hwang et al. |
| 2004/0223427 A1 | 11/2004 | Kim et al. |
| 2004/0246849 A1 | 12/2004 | Hwang et al. |
| 2004/0246851 A1 | 12/2004 | Hwang et al. |
| 2004/0246852 A1 | 12/2004 | Hwang et al. |
| 2004/0257934 A1 | 12/2004 | Gotoh et al. |
| 2005/0007910 A1 | 1/2005 | Ito et al. |
| 2005/0008346 A1 | 1/2005 | Noguchi et al. |
| 2005/0025007 A1 | 2/2005 | Park |
| 2005/0047294 A1 | 3/2005 | Park |
| 2005/0050402 A1 | 3/2005 | Koda et al. |
| 2005/0052972 A1 | 3/2005 | Park |
| 2005/0052973 A1 | 3/2005 | Park |
| 2005/0055500 A1 | 3/2005 | Park |
| 2005/0060489 A1 | 3/2005 | Park |
| 2005/0068877 A1 | 3/2005 | Yeo |
| 2005/0083740 A1 | 4/2005 | Kobayashi |
| 2005/0083767 A1 | 4/2005 | Terada et al. |
| 2005/0083830 A1 | 4/2005 | Martens et al. |
| 2005/0162989 A1 | 7/2005 | Hwang et al. |
| 2005/0195716 A1 | 9/2005 | Ko et al. |
| 2005/0207262 A1 | 9/2005 | Terada et al. |
| 2005/0237875 A1 | 10/2005 | Yamanaka et al. |
| 2005/0289389 A1 | 12/2005 | Yamagami et al. |
| 2006/0039268 A1 | 2/2006 | Yamanaka |
| 2006/0077827 A1 | 4/2006 | Takahashi |
| 2006/0083130 A1 | 4/2006 | Park |
| 2006/0136134 A1 | 6/2006 | Mihara |
| 2006/0195719 A1 | 8/2006 | Ueda et al. |
| 2006/0203635 A1 | 9/2006 | Ko et al. |
| 2006/0203638 A1 | 9/2006 | Ko et al. |
| 2006/0203684 A1 | 9/2006 | Ko et al. |
| 2006/0227694 A1 | 10/2006 | Woerlee et al. |
| 2006/0233078 A1 | 10/2006 | Terada et al. |
| 2006/0280076 A1 | 12/2006 | Bondijk |
| 2007/0211591 A1 | 9/2007 | Park et al. |
| 2007/0294571 A1 | 12/2007 | Park et al. |
| 2008/0046780 A1 | 2/2008 | Shibuya et al. |

FOREIGN PATENT DOCUMENTS

| | | |
|---|---|---|
| CN | 1140897 C | 1/1997 |
| CN | 1227950 A | 9/1999 |
| CN | 1246707 A | 3/2000 |
| CN | 1273419 A | 11/2000 |
| CN | 1294385 A | 5/2001 |
| CN | 1304533 A | 7/2001 |
| CN | 1328327 A | 12/2001 |
| CN | 1329334 A | 1/2002 |
| CN | 1338102 A | 2/2002 |
| CN | 1479304 A | 3/2004 |
| CN | 1652217 A | 8/2005 |
| CN | 1675708 A | 9/2005 |
| CN | 1685426 A | 10/2005 |
| DE | 199 54 054 A1 | 6/2000 |
| EP | 0 314 186 A2 | 5/1989 |
| EP | 0 325 823 A1 | 8/1989 |
| EP | 0 350 920 A2 | 1/1990 |
| EP | 0 428 208 A2 | 5/1991 |
| EP | 0 464 811 A2 | 1/1992 |
| EP | 0 472 484 A2 | 2/1992 |
| EP | 0 477 503 A2 | 4/1992 |
| EP | 0484555 A1 | 5/1992 |
| EP | 0 556 046 A1 | 8/1993 |
| EP | 0 871 172 A2 | 10/1998 |
| EP | 0 908 882 A2 | 4/1999 |
| EP | 0 952 573 A2 | 10/1999 |
| EP | 0957477 A2 | 11/1999 |
| EP | 0 971 345 A1 | 1/2000 |
| EP | 0 974 967 A1 | 1/2000 |
| EP | 0 989 554 A1 | 3/2000 |
| EP | 0 997 904 A1 | 5/2000 |
| EP | 1 026 681 B1 | 8/2000 |
| EP | 1 040 937 | 10/2000 |

| | | | | | | | |
|---|---|---|---|---|---|---|---|
| EP | 1 043 723 | A1 | 10/2000 | JP | 11-203792 | A | 7/1999 |
| EP | 1 132 914 | A2 | 9/2001 | JP | 11-306648 | A | 11/1999 |
| EP | 1 143 444 | A2 | 10/2001 | JP | 11-353857 | A | 12/1999 |
| EP | 1 148 493 | A2 | 10/2001 | JP | 2000-040308 | A | 2/2000 |
| EP | 1 152 414 | A2 | 11/2001 | JP | 2000-090588 | A | 3/2000 |
| EP | 1152402 | A1 | 11/2001 | JP | 2000-105980 | | 4/2000 |
| EP | 1 239 478 | A1 | 9/2002 | JP | 2000-149449 | A | 5/2000 |
| EP | 1 274 081 | A2 | 1/2003 | JP | 2000-195178 | A | 7/2000 |
| EP | 1 298 659 | A1 | 4/2003 | JP | 2000-215612 | | 8/2000 |
| EP | 1304698 | A2 | 4/2003 | JP | 2000-215644 | A | 8/2000 |
| EP | 1 321 940 | A1 | 6/2003 | JP | 2000-285000 | A | 10/2000 |
| EP | 1 329 888 | A1 | 7/2003 | JP | 2000-285607 | A | 10/2000 |
| EP | 1 347 452 | A2 | 9/2003 | JP | 2000-293948 | A | 10/2000 |
| EP | 1400973 | A2 | 3/2004 | JP | 2000-293954 | A | 10/2000 |
| EP | 1 547 065 | A | 6/2005 | JP | 2000-298954 | A | 10/2000 |
| EP | 1 564 740 | A1 | 8/2005 | JP | 2000-322835 | A | 11/2000 |
| EP | 1 573 723 | A | 9/2005 | JP | 2000-322837 | A | 11/2000 |
| EP | 1595251 | A | 11/2005 | JP | 2000-322875 | A | 11/2000 |
| EP | 1599869 | A | 11/2005 | JP | 2000-322876 | A | 11/2000 |
| EP | 1 609 135 | A | 12/2005 | JP | 2000-339874 | | 12/2000 |
| EP | 1 612 790 | A1 | 1/2006 | JP | 2000-348057 | A | 12/2000 |
| EP | 1 623 422 | A | 2/2006 | JP | 2001-14809 | A | 1/2001 |
| EP | 1652174 | A | 5/2006 | JP | 2001-023317 | A | 1/2001 |
| EP | 1652175 | A | 5/2006 | JP | 2001-069440 | A | 3/2001 |
| EP | 1658613 | A2 | 5/2006 | JP | 2001-110168 | A | 4/2001 |
| EP | 1662505 | A1 | 5/2006 | JP | 2001-148166 | A | 5/2001 |
| EP | 1644920 | B1 | 5/2009 | JP | 2001-167472 | A | 6/2001 |
| GB | 2356735 | A | 5/2001 | JP | 2001-236743 | A | 8/2001 |
| JP | 63-091842 | A | 4/1988 | JP | 2001-266464 | A | 9/2001 |
| JP | 64-46280 | A | 2/1989 | JP | 2001-319339 | | 11/2001 |
| JP | 1079940 | A | 3/1989 | JP | 2001-351334 | A | 12/2001 |
| JP | 01-263955 | A | 10/1989 | JP | 2001-357623 | A | 12/2001 |
| JP | 02-023417 | A | 1/1990 | JP | 2001-357835 | A | 12/2001 |
| JP | 2-023417 | A | 1/1990 | JP | 2002-008247 | A | 1/2002 |
| JP | 2054327 | | 2/1990 | JP | 2002-015507 | A | 1/2002 |
| JP | 3-46164 | A | 2/1991 | JP | 2002-015525 | A | 1/2002 |
| JP | 4-114371 | A | 4/1992 | JP | 2002-50131 | A | 2/2002 |
| JP | 04-172662 | | 6/1992 | JP | 2002-056619 | A | 2/2002 |
| JP | 5-48456 | A | 2/1993 | JP | 2002-58620 | A | 2/2002 |
| JP | 05-274814 | A | 10/1993 | JP | 2005-32374 | A | 2/2002 |
| JP | 6-223794 | A | 8/1994 | JP | 2002-117649 | A | 4/2002 |
| JP | 6-259886 | A | 9/1994 | JP | 2002-117652 | A | 4/2002 |
| JP | 6-338139 | A | 12/1994 | JP | 2002-170342 | | 6/2002 |
| JP | 06-349201 | A | 12/1994 | JP | 2002-215612 | A | 8/2002 |
| JP | 7-29177 | A | 1/1995 | JP | 2002-245723 | A | 8/2002 |
| JP | 07-121993 | | 5/1995 | JP | 2002-288938 | A | 10/2002 |
| JP | 7-220400 | A | 8/1995 | JP | 2002-324002 | A | 11/2002 |
| JP | 08-050766 | | 2/1996 | JP | 2002-329321 | A | 11/2002 |
| JP | 08-096522 | A | 4/1996 | JP | 2002-352522 | A | 12/2002 |
| JP | 08-273162 | A | 10/1996 | JP | 2003-030844 | A | 1/2003 |
| JP | 8-286841 | A | 11/1996 | JP | 2003-505813 | A | 2/2003 |
| JP | 9-45004 | A | 2/1997 | JP | 2003-91938 | A | 3/2003 |
| JP | 9-63555 | A | 3/1997 | JP | 2003-510742 | A | 3/2003 |
| JP | 09-145634 | A | 6/1997 | JP | 2003-151216 | | 5/2003 |
| JP | 09-231053 | A | 9/1997 | JP | 2003-208759 | A | 7/2003 |
| JP | 9-251721 | A | 9/1997 | JP | 2003-228962 | | 8/2003 |
| JP | 09-270175 | A | 10/1997 | JP | 2003-249029 | A | 9/2003 |
| JP | 9-282849 | A | 10/1997 | JP | 2003-264800 | A | 9/2003 |
| JP | 9-288884 | A | 11/1997 | JP | 2003-335062 | | 11/2003 |
| JP | 09-320204 | | 12/1997 | JP | 2003-536194 | A | 12/2003 |
| JP | 10-49991 | A | 2/1998 | JP | 2004-79087 | A | 3/2004 |
| JP | 10-050005 | A | 2/1998 | JP | 2004-095057 | | 3/2004 |
| JP | 10-050032 | A | 2/1998 | JP | 2004-118910 | A | 4/2004 |
| JP | 10-187356 | | 7/1998 | JP | 2004-171714 | A | 6/2004 |
| JP | 10-187357 | | 7/1998 | JP | 2004-213774 | | 7/2004 |
| JP | 10-187358 | | 7/1998 | JP | 2004-527436 | T | 9/2004 |
| JP | 10-187359 | | 7/1998 | JP | 2004-280864 | A | 10/2004 |
| JP | 10-187360 | | 7/1998 | JP | 2004-280865 | A | 10/2004 |
| JP | 10-187361 | A1 | 7/1998 | JP | 2004-280866 | | 10/2004 |
| JP | 10-222316 | A | 8/1998 | JP | 2004-303381 | A | 10/2004 |
| JP | 10-261286 | A | 9/1998 | JP | 2005-004912 | A | 1/2005 |
| JP | 10-289524 | A | 10/1998 | JP | 2005-44495 | A | 2/2005 |
| JP | 10-320924 | A | 12/1998 | JP | 2005-056542 | | 3/2005 |
| JP | 11-039801 | | 2/1999 | JP | 2005-166096 | A | 6/2005 |
| JP | 11-66751 | A | 3/1999 | JP | 2005-174528 | A | 6/2005 |
| JP | 11086436 | | 3/1999 | JP | 2005-196903 | A | 7/2005 |
| JP | 11-96684 | A | 4/1999 | JP | 2005-535993 | A | 11/2005 |
| JP | 11-110888 | A | 4/1999 | JP | 2005-339773 | A | 12/2005 |
| JP | 11-134809 | | 5/1999 | JP | 2005-538490 | A | 12/2005 |

| | | | | | | |
|---|---|---|---|---|---|---|
| JP | 2005-538491 A | 12/2005 | | WO | WO 00/19432 A1 | 4/2000 |
| JP | 2006-500707 T | 1/2006 | | WO | WO-00/54274 A1 | 9/2000 |
| JP | 2006-501590 A | 1/2006 | | WO | WO-01/06512 A1 | 1/2001 |
| JP | 2006-502520 A | 1/2006 | | WO | WO-01/22416 A1 | 3/2001 |
| JP | 2006-503396 | 1/2006 | | WO | WO-01/24179 A1 | 4/2001 |
| JP | 2006-503396 A | 1/2006 | | WO | WO-01/35408 | 5/2001 |
| JP | 2006-085859 A | 3/2006 | | WO | WO-01/75879 A1 | 10/2001 |
| JP | 2006-512699 A | 4/2006 | | WO | WO-01/93035 A2 | 12/2001 |
| JP | 2006-514389 A | 4/2006 | | WO | WO-01/95330 | 12/2001 |
| JP | 2006-518533 A | 8/2006 | | WO | WO 01/95330 A2 | 12/2001 |
| JP | 2006-519445 A | 8/2006 | | WO | WO 02/057195 A1 | 7/2002 |
| JP | 2006-519455 A | 8/2006 | | WO | WO 02/086887 A1 | 10/2002 |
| JP | 2006-520064 A | 8/2006 | | WO | WO-02/086888 A2 | 10/2002 |
| JP | 2006-522991 A | 10/2006 | | WO | WO-03/007296 A1 | 1/2003 |
| JP | 2007-502512 T | 2/2007 | | WO | WO-03/025924 A1 | 3/2003 |
| JP | 2007-66515 A | 3/2007 | | WO | WO-03/030173 A2 | 4/2003 |
| JP | 2008-511095 A | 4/2008 | | WO | WO-03/079353 A1 | 9/2003 |
| JP | 2008-282532 A | 11/2008 | | WO | WO 03/105138 A1 | 12/2003 |
| JP | 2009-203493 A | 9/2009 | | WO | WO 03/105141 A1 | 12/2003 |
| KR | 10-2000-0018533 A | 4/2000 | | WO | WO 03/105152 A1 | 12/2003 |
| KR | 10-2000-0032046 A | 6/2000 | | WO | WO-2004/015707 A1 | 2/2004 |
| KR | 10-2000-0033285 A | 6/2000 | | WO | WO-2004/015708 A1 | 2/2004 |
| KR | 10-2002-0007298 A | 1/2002 | | WO | WO 2004/019331 A1 | 3/2004 |
| KR | 10-2002-0081411 A | 10/2002 | | WO | WO-2004/025648 A1 | 3/2004 |
| KR | 2003-0067650 | 8/2003 | | WO | WO-2004/025649 A1 | 3/2004 |
| KR | 10-2004-0009358 A | 1/2004 | | WO | WO 2004/027775 A1 | 4/2004 |
| KR | 10-2004-0015424 A | 2/2004 | | WO | WO-2004/029668 A2 | 4/2004 |
| KR | 10-2004-0023126 A | 3/2004 | | WO | WO-2004/029941 A1 | 4/2004 |
| KR | 10-2004-0023127 A | 3/2004 | | WO | WO-2004/029942 A1 | 4/2004 |
| KR | 10-2004-0032674 A | 4/2004 | | WO | WO-2004/029968 A2 | 4/2004 |
| KR | 10-2004-0065004 A | 7/2004 | | WO | WO-2004/034396 A1 | 4/2004 |
| KR | 10-2004-0094301 A | 11/2004 | | WO | WO-2004/036561 A1 | 4/2004 |
| KR | 1020040094301 A | 11/2004 | | WO | WO-2004/053872 A1 | 6/2004 |
| KR | 10-2004-0100702 A | 12/2004 | | WO | WO-2004/053874 A1 | 6/2004 |
| KR | 10-2005-0067396 A | 6/2005 | | WO | WO-2004/059648 A2 | 7/2004 |
| KR | 10-2005-0085444 A | 8/2005 | | WO | WO 2004/064064 A1 | 7/2004 |
| KR | 10-0539509 A | 12/2005 | | WO | WO-2004/068476 A1 | 8/2004 |
| KR | 10-2006-0052789 A | 5/2006 | | WO | WO-2004/068476 A1 | 8/2004 |
| RU | 2054203 C1 | 2/1996 | | WO | WO 2004/072963 A1 | 8/2004 |
| RU | 2 174 716 C2 | 10/2001 | | WO | WO-2004/015180 | 9/2004 |
| RU | 2 192 673 C2 | 11/2002 | | WO | WO-2004/075180 A1 | 9/2004 |
| RU | 2223556 C2 | 2/2004 | | WO | WO 2004/077432 A1 | 9/2004 |
| RU | 2 228 547 C2 | 5/2004 | | WO | WO-2004/079631 A2 | 9/2004 |
| RU | 2005 103 626 | 9/2005 | | WO | WO 2004/079730 A1 | 9/2004 |
| RU | 2005 127 337 | 2/2006 | | WO | WO 2004/079731 A1 | 9/2004 |
| TW | 302475 A | 3/1985 | | WO | WO-2004/079731 A1 | 9/2004 |
| TW | 283232 A | 8/1996 | | WO | WO-2004/079740 A1 | 9/2004 |
| TW | 371752 A | 10/1999 | | WO | WO-2004/081922 | 9/2004 |
| TW | 413805 | 12/2000 | | WO | WO-2004/081926 A1 | 9/2004 |
| TW | 413806 | 12/2000 | | WO | WO-2004/086379 A1 | 10/2004 |
| TW | 434476 | 5/2001 | | WO | WO-2004/093035 A1 | 10/2004 |
| TW | 448435 B | 8/2001 | | WO | WO-2004/100155 A1 | 11/2004 |
| TW | 452770 B | 9/2001 | | WO | WO-2004/100156 A1 | 11/2004 |
| TW | 470946 B | 1/2002 | | WO | WO 2004/105024 A1 | 12/2004 |
| TW | 484119 B | 4/2002 | | WO | WO-2005/004123 A1 | 1/2005 |
| TW | 486913 B | 5/2002 | | WO | WO-2005/004154 A2 | 1/2005 |
| TW | 490871 | 6/2002 | | WO | WO 2005/004154 A2 | 1/2005 |
| TW | 495750 | 7/2002 | | WO | WO 2005/006314 A1 | 1/2005 |
| TW | 497098 B | 8/2002 | | WO | WO 2005/006315 A1 | 1/2005 |
| TW | 508592 B | 11/2002 | | WO | WO 2005/006316 A1 | 1/2005 |
| TW | 509890 | 11/2002 | | WO | WO 2005/013265 A1 | 2/2005 |
| TW | 518573 B | 1/2003 | | WO | WO 2005/013266 A1 | 2/2005 |
| TW | 200401275 B | 1/2004 | | WO | WO-2005/062306 A1 | 7/2005 |
| TW | 200402045 B | 2/2004 | | WO | WO-2005/073971 A2 | 8/2005 |
| TW | 200403663 B | 3/2004 | | WO | WO 2005/109432 A1 | 11/2005 |
| WO | WO-84/00628 A1 | 2/1984 | | WO | WO-2005/124768 A1 | 12/2005 |
| WO | WO-96/30902 A1 | 10/1996 | | WO | WO 2005/124774 A1 | 12/2005 |
| WO | WO-97/22182 A1 | 6/1997 | | | | |
| WO | WO-97/36296 A1 | 10/1997 | | | | |
| WO | WO 00/07300 A1 | 2/2000 | | | | |

\* cited by examiner

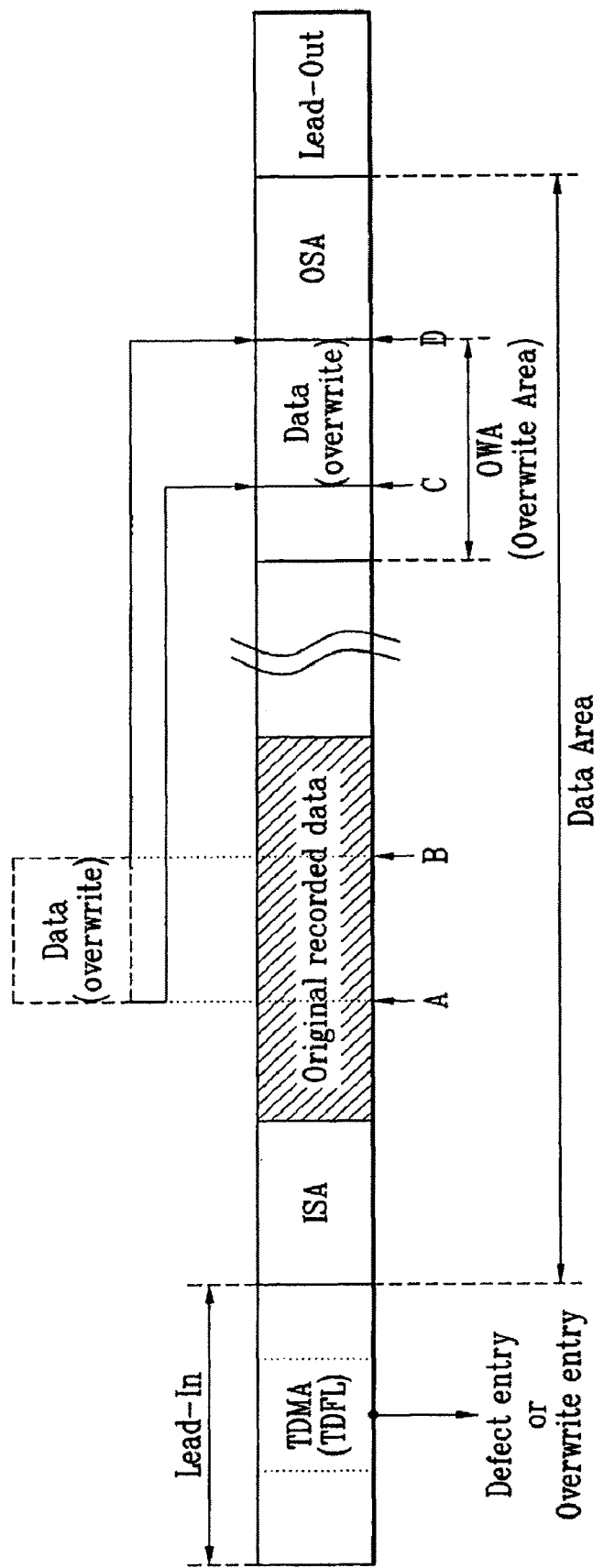

| Entry type | Status 1 | Status 2 |
|---|---|---|
| Defect entry | 0000 | 0000 |
| | 0001 | 0000 |
| Overwrite entry | 1100 | 0000 |
| | 1100 | others |

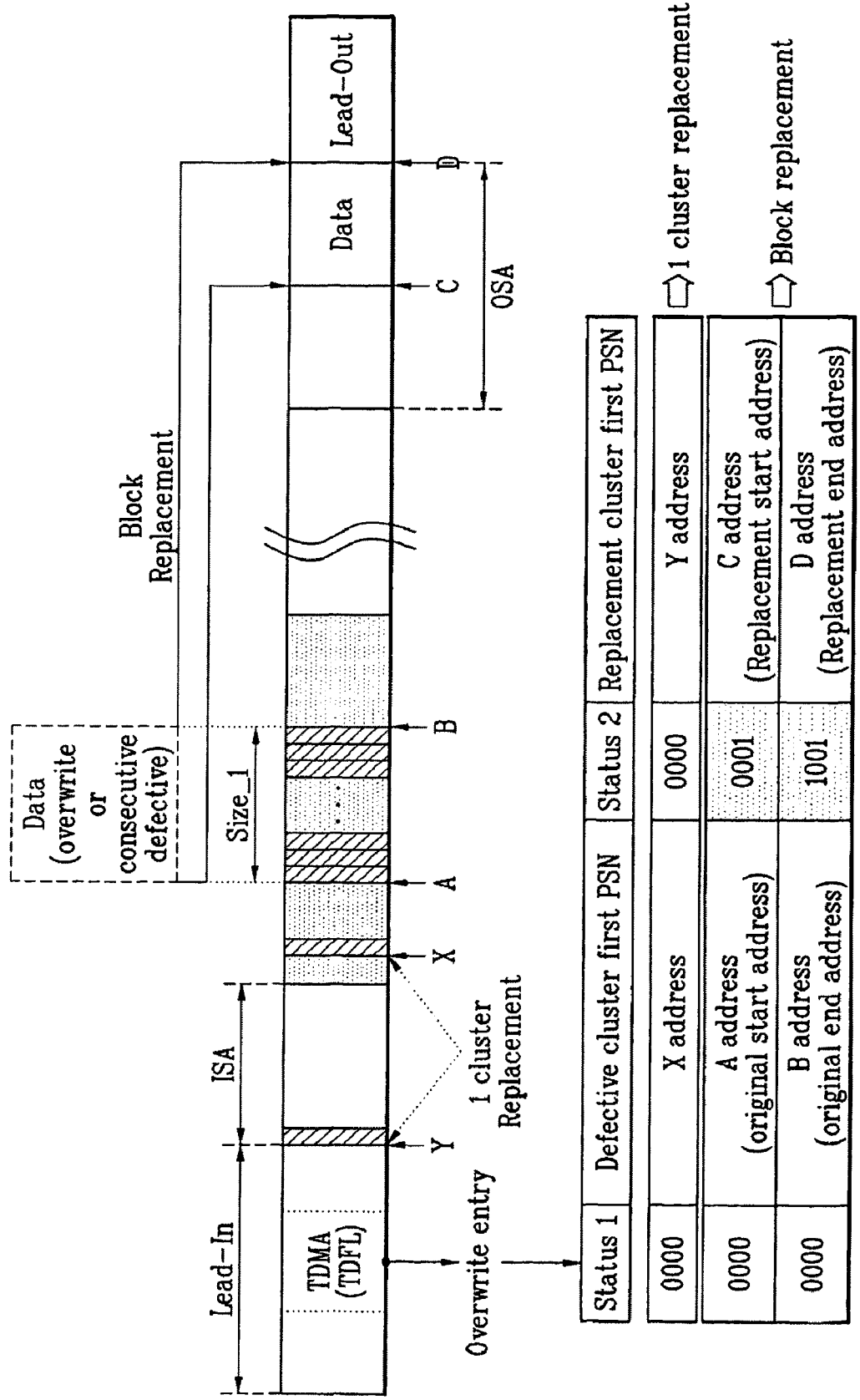

\* RAD : Re-Allocation Defective cluster
BRAD : Block RAD

| Entry type | Status 1 | Status 2 |
|---|---|---|
| RAD | 0000 | 0000 |
| BRAD | 0000 | 0000 or 1001 |
| NRD | 0001 | 0000 |
| BNRD | 0001 | 0001 or 1001 |

METHOD OF MANAGING OVERWRITE AND METHOD OF RECORDING MANAGEMENT INFORMATION ON AN OPTICAL DISC WRITE ONCE

This application is a continuation of U.S. patent application Ser. No. 10/731,170 filed on Dec. 10, 2003 now U.S. Pat. No. 7,668,054, which claims the benefit of the Korean Application No. P2002-78889 filed on Dec. 11, 2002 and P2003-5212 filed on Jan. 27, 2003 and P2003-9893 filed on Feb. 17, 2003 and P2003-13199 filed on Mar. 3, 2003, which are all hereby incorporated by reference.

BACKGROUND OF THE INVENTION

1. Field of the Invention

The present invention relates to a method of managing overwrite and a method of recording management information on an optical disc write once.

2. Discussion of the Related Art

Recently, it is expected that a new HD-DVD (High-Density Digital Versatile Disc) on which video data and audio data can be written and stored in high qualities and in large quantities, for example, a BD-RE (Blu-ray Rewritable Disc), will be developed and produced.

The BD-RE, as shown in FIG. 1, is divided into an LIA (Lead-In Area), a data area, and an LOA (Lead-Out Area). In the The BD-RE records data in the unit of a cluster corresponding to a specified recording unit, and as shown in FIG. 1, it is detected if any defect area exists in the data area during recording the data. If the defect area is detected, a series of replacement-recording operations for performing a replacement recording of the data recorded in the defect area in the unit of a cluster in a spare area, for example, an ISA, is performed. Also, position information of the defect area and position information replacement-recorded in the spare area are recorded and stored in a defect list in the read-in area as management information.

Accordingly, even if the defect area exists in the data area of the BD-RE, the data recorded in the defect area is replacement-recorded in the spare area, and during the reproducing operation, the data replacement-recorded in the spare area, instead of the data of the defect area, is read out and reproduced with reference to the management information, so that any data recording/reproducing error can be prevented in advance.

Meanwhile, the standardization of a BD-WO (Blu-ray Disc Write Once) has recently been discussed among companies concerned, and since the BD-WO is recordable only once over the whole area of the disc, it is physically impossible to perform overwrite on the BD-WO unlike the BD-RE.

However, it may be necessary to perform the overwrite on a BD-WO in order to edit the recorded data, to modify a part of the recorded data, or to offer convenience to a user or a host, and thus an efficient scheme for this is urgently demanded.

SUMMARY OF THE INVENTION

Accordingly, the present invention is directed to a method of managing overwrite and a method of recording management information on an optical disc write once that substantially obviate one or more problems due to limitations and disadvantages of the related art.

An object of the present invention is to provide a method of managing overwrite, a method of recording management information on an optical disc write once, and a recording/reproducing device which make it possible to overwrite logically on the optical disc write once.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of managing overwrite on an optical disc write once includes replacement-recording data which is requested to be overwritten in a specified area of the disc where recording is completed in another data area physically separated from the specified area in the disc, and producing and recording management information for reproducing the physically replacement-recorded data.

In another aspect of the present invention, a method of recording management information on an optical disc write once includes replacement-recording data of an area of the disc, where an overwrite is requested or a defect is produced, in a specified area of the disc, and in recording management information on the overwrite, separately recording the management information in a case that one recording unit is replacement-recorded and the management information in a case that a plurality of recording units are replacement-recorded.

In still another aspect of the present invention, a method of recording management information on an optical disc write once includes replacement-recording data of an area of the disc, where an overwrite is requested or a defect is produced, in a specified area of the disc, and in recording management information on the overwrite, separately recording the management information in a case that the data is replacement-recorded by an overwrite request and the management information in a case that the data is replacement-recorded due to a defect area.

In still another aspect of the present invention, an apparatus for recording/reproducing an optical disc write once includes a controller for transferring a recording command for requesting recording on a specified area of the disc, and a recording/reproducing device for judging whether the specified area is an area where recording is completed or an area where no recording is performed, and replacement-recording data in another area of a data area and recording a fact that the replacement recording has been performed as management information on the disc if it is judged that the specified area is the area where the recording is completed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4A, 4B and 5 illustrate methods of managing overwrite on an optical disc write once according to still other embodiments of the present invention;

FIG. 10 illustrates a method of recording management information on an optical disc write once according to still another embodiment of the present invention;

DETAILED DESCRIPTION OF THE INVENTION

Reference will now be made in detail to the method of managing overwrite on an optical disc write once according to the preferred embodiments of the present invention, examples of which are illustrated in the accompanying drawings. Wherever possible, the same reference numbers will be used throughout the drawings to refer to the same or like parts.

The present invention makes it possible to perform overwrite even on an optical disc write once. The term "overwrite" means a repeated recording on a specified area in a rewritable optical disc. In other words, overwrite is just the inherent characteristic of the rewritable optical disc, and it is generally known that it is impossible to perform overwrite on the optical disc write once.

However, the present invention makes it possible to logically perform overwrite as the physical characteristic of the optical disc write once is maintained.

Figure 1:
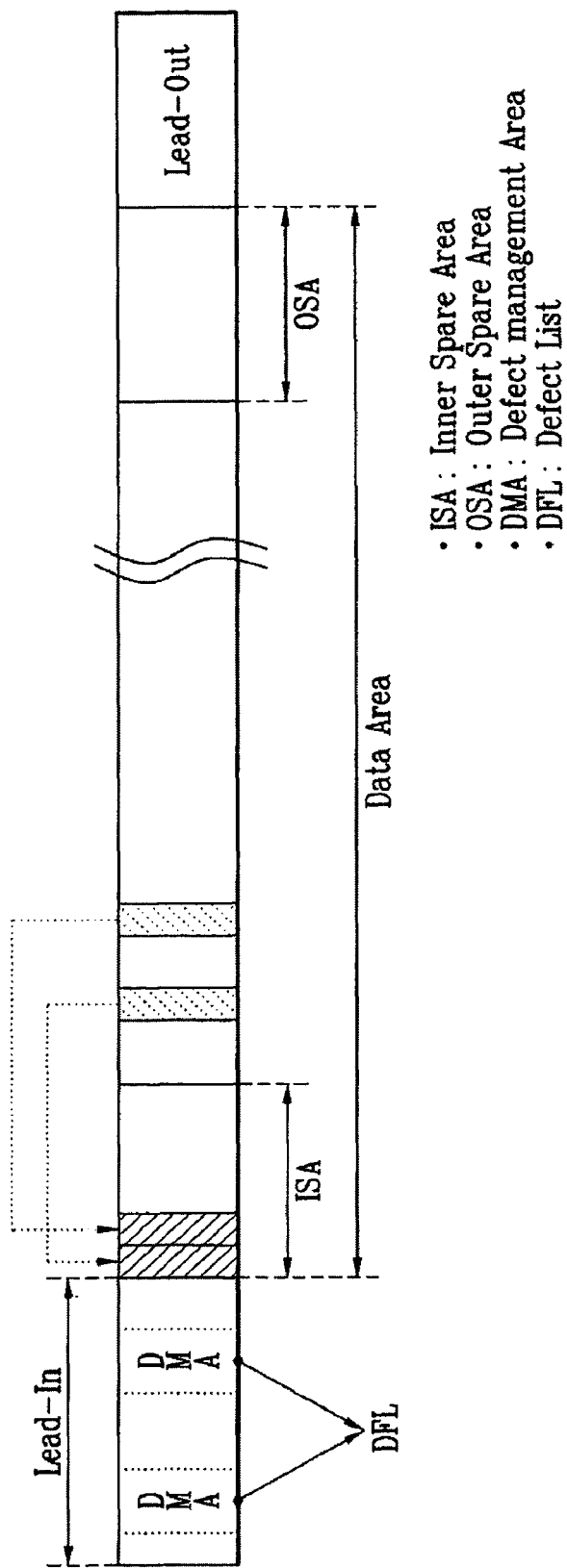
FIG. 1 schematically illustrates the construction of a rewritable optical disc and a defect management method according to the related art.
Figure 2:
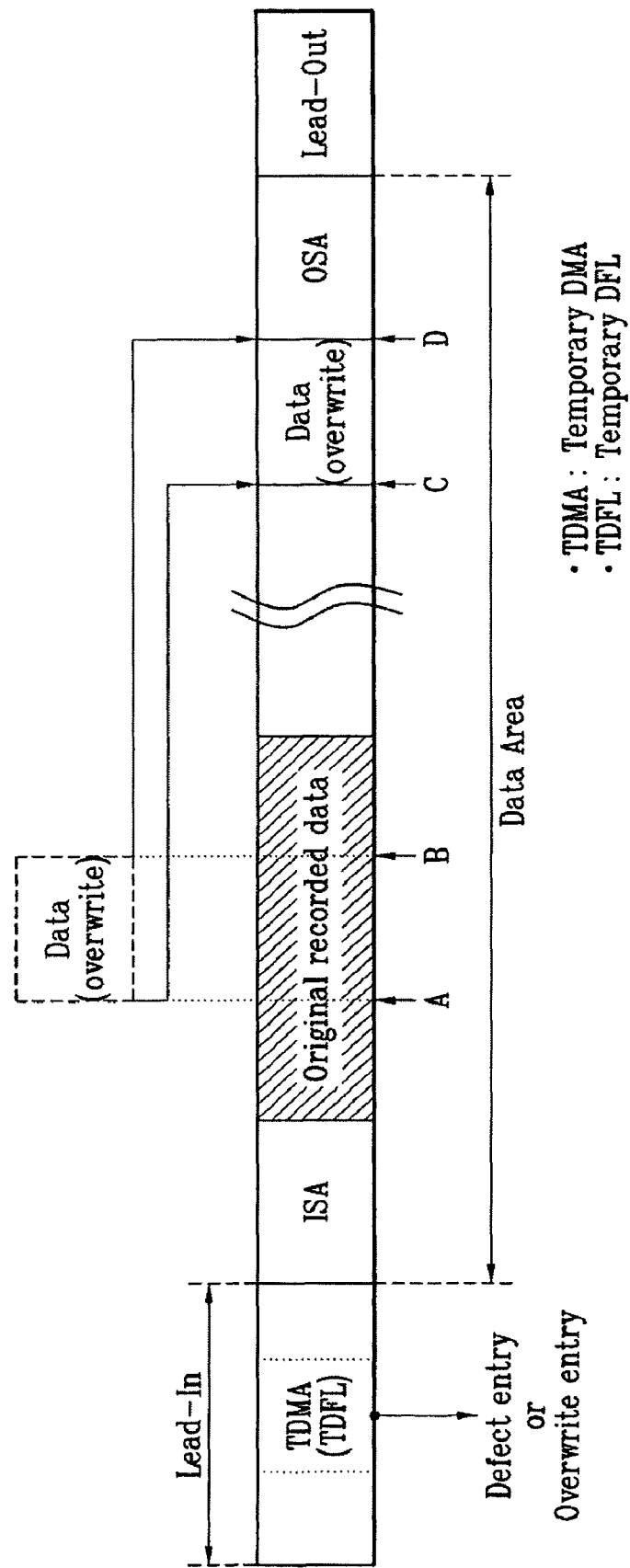
FIG. 2 illustrates a method of managing overwrite on an optical disc write once according to an embodiment of the present invention.

FIG. 2 illustrates a method of managing overwrite on an optical disc write once according to an embodiment of the present invention. For example, the BD-WO (Blu-ray Disc Write Once) includes an LIA (Lead-In Area), a data area, and an LOA (Lead-Out Area). In the head and the tail of the data area, an ISA (Inner Spare Area) and an OSA (Outer Spare Area) may be dividedly arranged.

Also, in the disc, a TDMA (Temporary Defect Management Area) is provided. A TDFL (Temporary Defect List) is recorded in the TDMA, and a defect entry or an overwrite entry is recorded in the TDFL as management information. Accordingly, in the case that the data of the corresponding area is replacement-recorded in another area in the data area due to the defect area or by an overwrite request, the management information is recorded as the TDFL in the TDMA.

In FIG. 2, if an already recorded area already exists in the data area, the 'overwrite' in the corresponding area is not physically permitted due to the characteristic of the optical disc write once. However, if a recording command of a user or a host requests performing of the recording on an A-B area (e.g., already recorded area) as shown in FIG. 2, the present invention makes a driver itself perform the replacement recording of data in another area in the data area. Accordingly, the user or the host can command the recording irrespective of whether the specified area of the disc is recorded or not, and thus the user can use the optical disc write once just like the rewritable optical disc. This is called a logical overwrite (LOW) in distinction from the physical overwrite.

Specifically, in carrying out the recording command on the A-B area as shown in FIG. 2, overwrite cannot be performed on the corresponding area since it is already recorded area. Instead, the recording command can be carried out in a manner that the data is replacement-recorded in a C-D area in front of an OSA (Outer Spare Area) in the data area, and the corresponding management area is recorded in the TDMA of the disc as the TDFL information. Thereafter, if a user or a host commands the reproducing of the data in the A-B area of the disc, the driver reproduces the data stored in the C-D area instead of the data in the A-B area with reference to the recorded management information.

FIGS. 3, 4A, 4B and 5 show the different areas where the replacement recording is performed by the overwrite request, and FIGS. 6 to 12 show methods of recording management information on overwrite or consecutive defect areas according to the embodiments of the present invention. It is noted that the same reference numbers will be used throughout the drawings to refer to the same or like parts.

Figure 3:
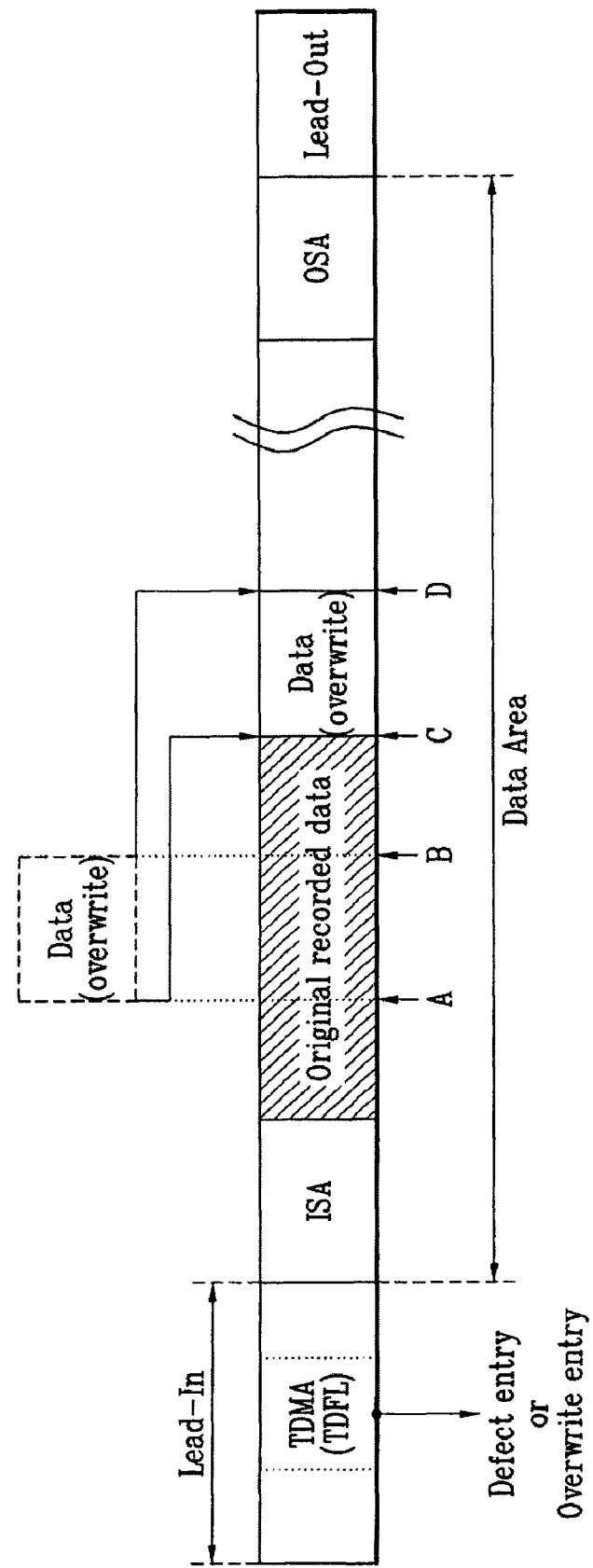
FIG. 3 illustrates a method of managing overwrite on an optical disc write once according to another embodiment of the present invention.

FIG. 3 illustrates a method of managing overwrite on an optical disc write once according to another embodiment of the present invention. This embodiment is characterized in that the data of the area where overwrite is requested is replacement-recorded to follow the already recorded area. This embodiment is the same as the embodiment of FIG. 2 except for the replacement-recorded area.

Figure 4A:
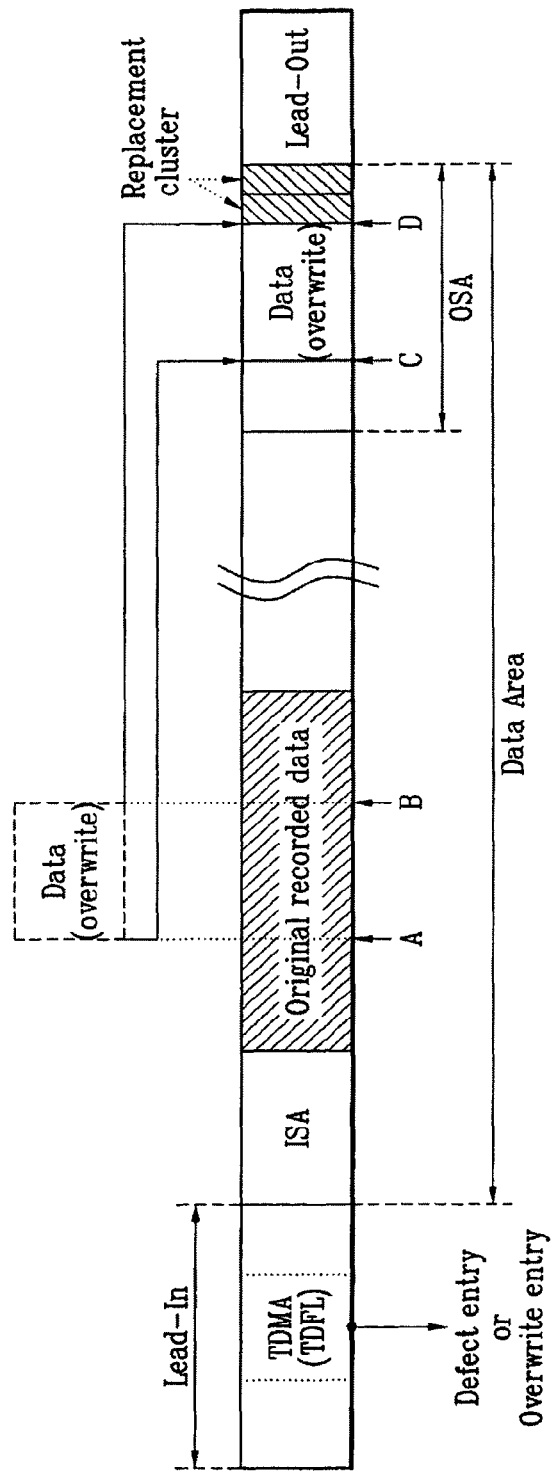
Figure 4B:
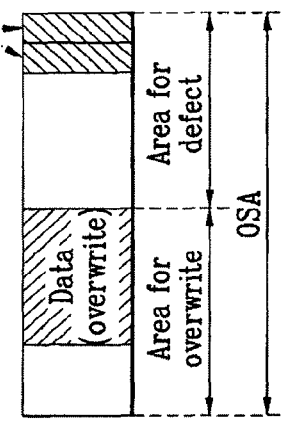

FIG. 4A shows a method of managing overwrite on an optical disc write once according to still another embodiment of the present invention. This embodiment is characterized in that the data of the area (e.g., A-B area) where overwrite is requested is replacement-recorded in the C-D area in the spare area. Thus, in the spare area, both a replacement cluster due to the defect area and a replacement cluster due to the overwrite request are recorded. As will be explained later, this means that the replacement recording due to the overwrite request can be treated in the same manner as the replacement recording due to the defect area. Also, as shown in FIG. 4B, the OSA can be divided into an area for defect and an area for overwrite.

FIG. 5 shows a method of managing overwrite on an optical disc write once according to still another embodiment of the present invention. In FIG. 5, the data to be recorded in the area (e.g., A-B area) where overwrite is requested is replacement-recorded in the C-D area in a separate overwrite area (OWA). That is, the spare area ISA or OSA is the replacement-recorded area when the defect area is produced, and the OWA is the replacement-recorded area when overwrite is requested. Accordingly, the replacement recording due to the defect area and the replacement recording by the overwrite request are clearly discriminated from each other.

Figure 6:
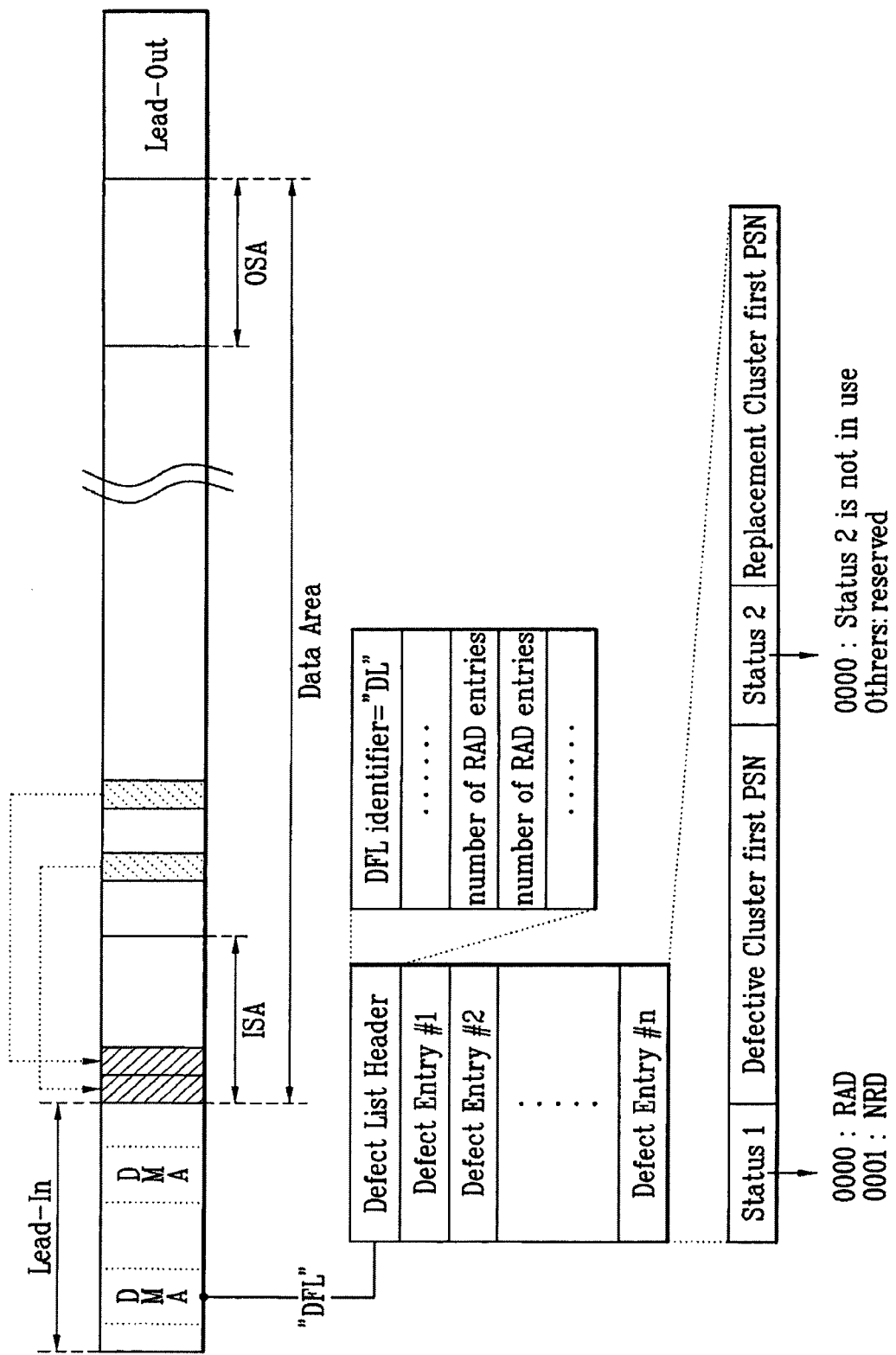
FIG. 6 schematically illustrates a method of recording management information on a rewritable optical disc according to the related art.

FIGS. 6 to 12 show methods of recording management information according to the related art and according to the present invention. Referring to FIG. 6, a method of recording management information on the BD-RE disc according to the related art is illustrated in comparison to the method of recording management information on the BD-WO according to the present invention.

The defect information is recorded in the LIA of the disc, and is composed of a defect list header and a defect entry. The defect list header includes an identifier (ID) information for information the defect list and information which indicates the number of defect entries. One defect entry is composed of 8 bytes, and includes four fields of 'status1', 'defective cluster first PSN (Physical sector number)', 'status2' and 'replacement cluster first PSN'. In the BD-RE, the 'status1' information indicates information on the type of defect entry. For example, if it is '0000b', it is a RAD (Re-Allocation Defective) type defect entry where the replacement recording is normally completed, and if it is '0001b', it is an NRD (Non-Reallocation Defective) type defect entry where a replacement area for the replacement recording is not designated. Also, the 'defective cluster first PSN' field is for recording positional information of the cluster where the defect is produced, and it is general that this field is indicated as the first PSN of the corresponding cluster. Also, the 'status2' field is a field which is not used in the BD-RE. To be explained later, according to the present invention, the management information is recorded actively using the 'status2' field. The 'replacement cluster first PSN' field is for recording positional information of the replacement-recorded area in the spare area due to the defect area. In the case of the RAD type defect entry, the information on the corresponding replacement-recorded position is normally recorded, but in the case of the NRD type defect entry, the replacement recording is not performed and thus this field is set to a 'zero' value.

Figure 7:
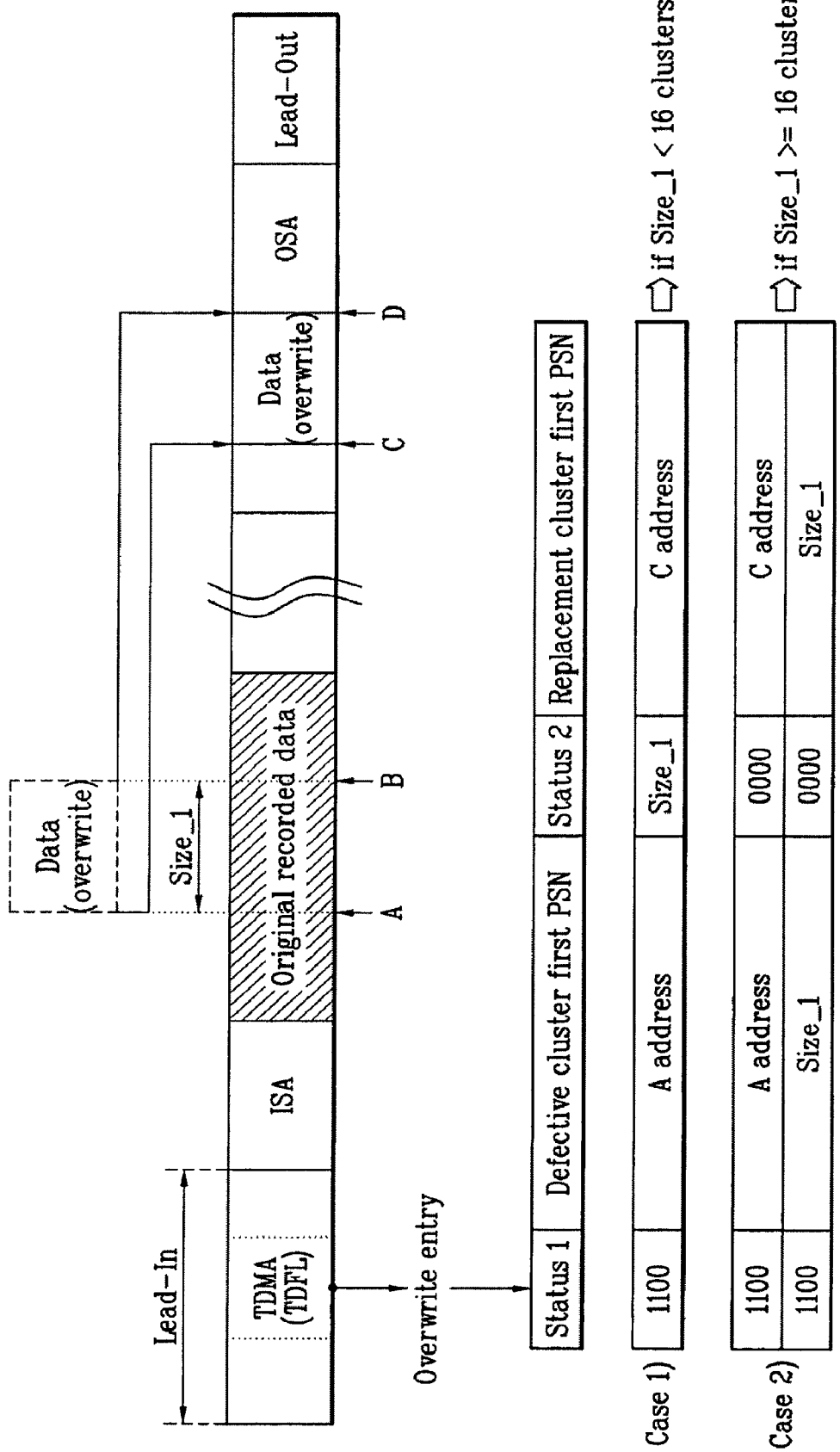
FIG. 7 illustrates a method of recording management information on an optical disc write once according to an embodiment of the present invention.
Figures 8A, 8B:
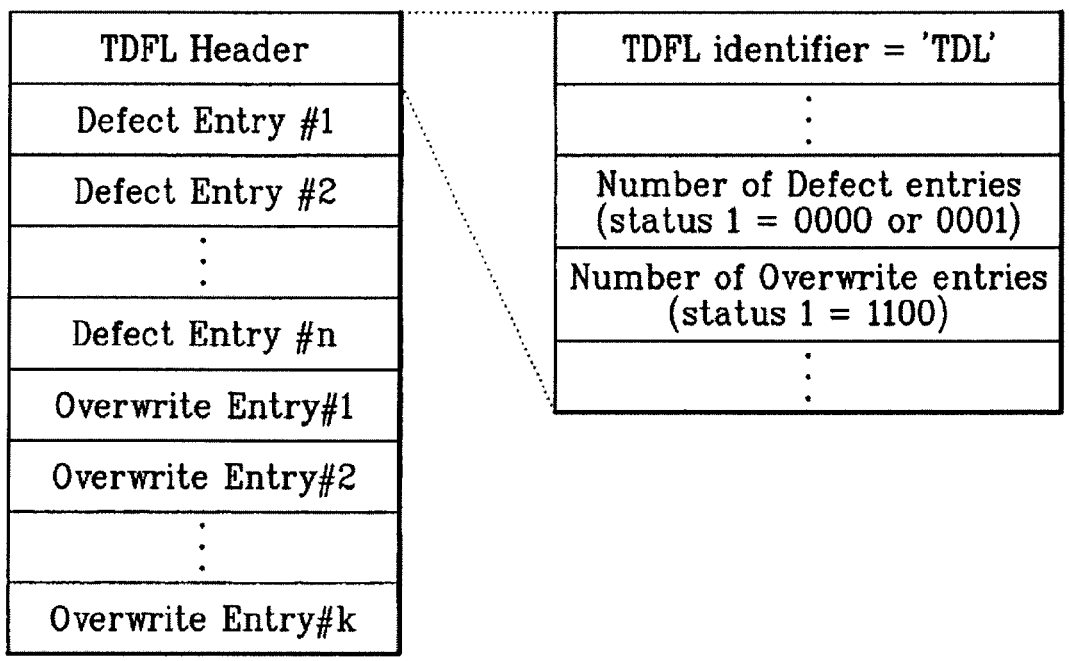
FIGS. 8A and 8B illustrate tables showing contents of management information on an optical disc write once of FIG. 7 according to the present invention.
Figure 9:
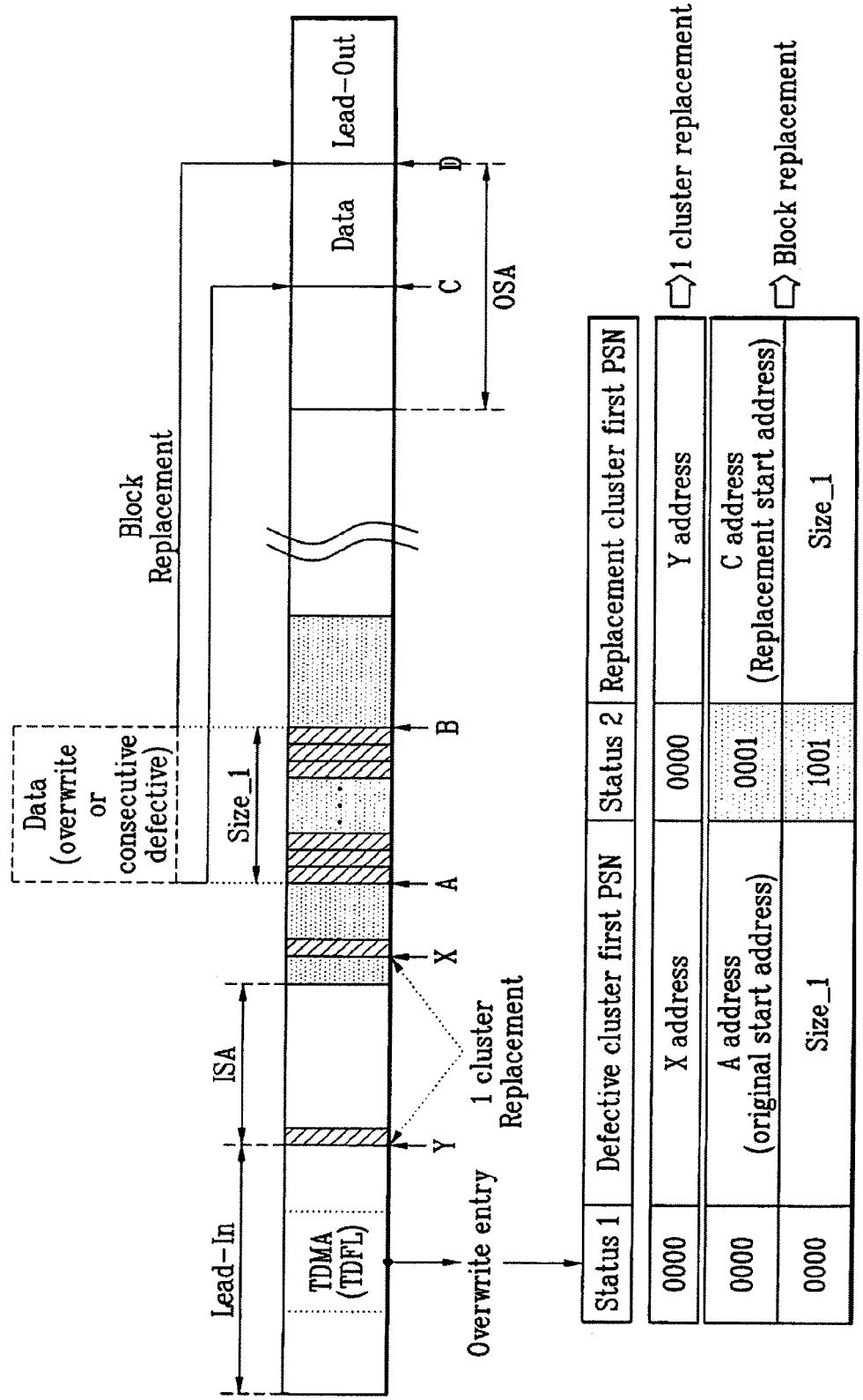
FIG. 9 illustrates a method of recording management information on an optical disc write once according to another embodiment of the present invention.
Figures 11A, 11B:
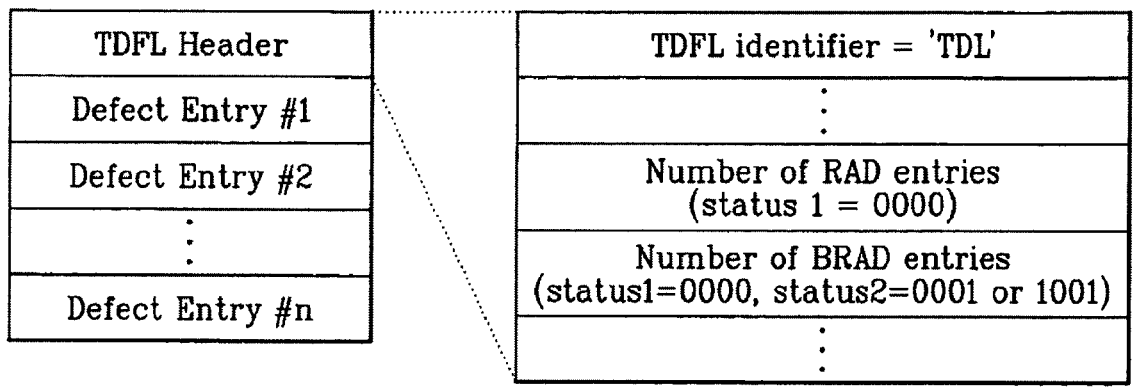
FIGS. 11A and 11B illustrate tables showing contents of management information on an optical disc write once of FIGS. 9 and 10 according to the present invention.
Figure 12:
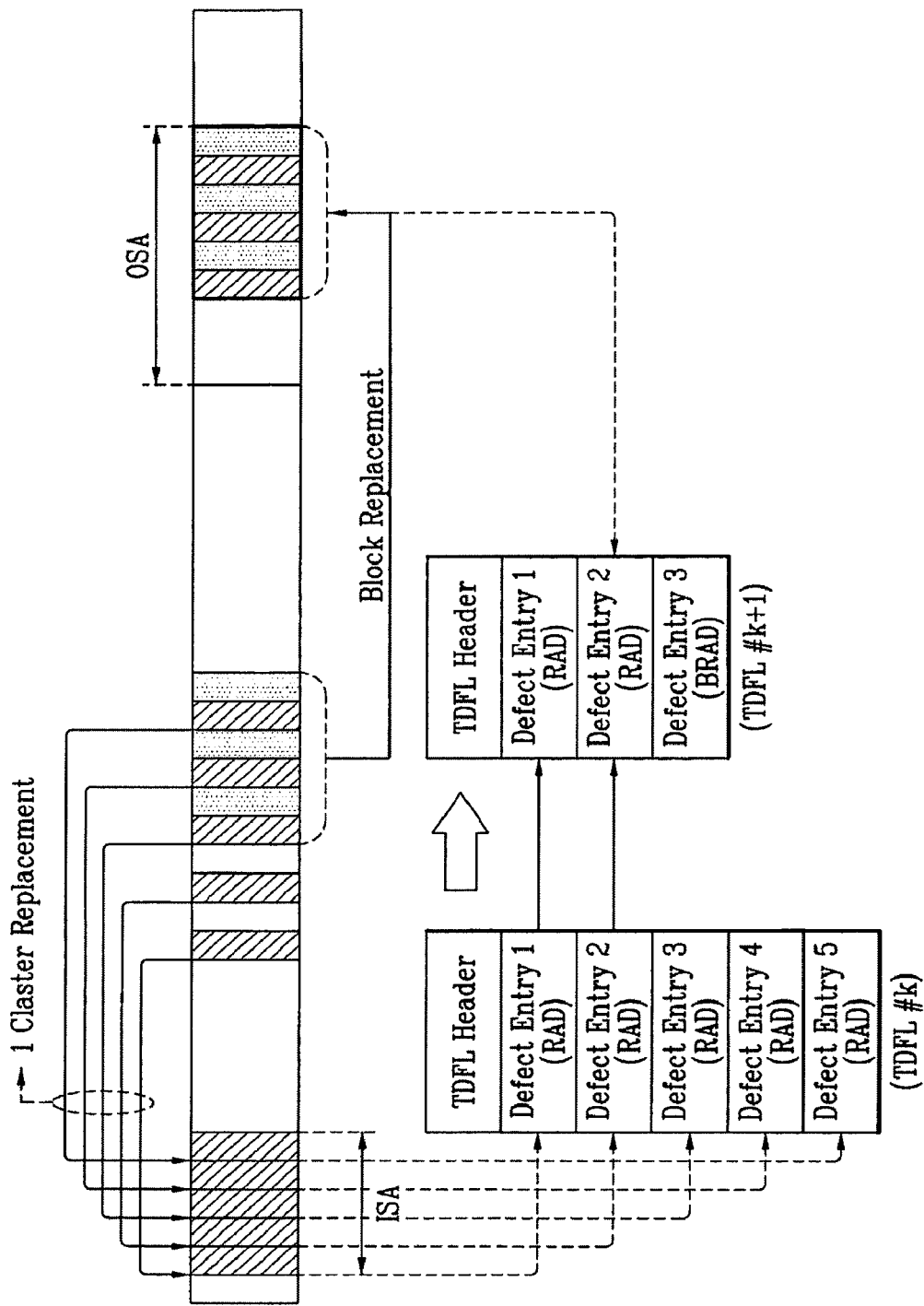
FIG. 12 illustrates a method of updating management information on an optical disc write once of FIGS. 9 and 10 according to the present invention.

FIGS. 7 to 12 illustrate methods of recording management information on an optical disc write once according to embodiments of the present invention. In the present invention, the recording of the management information is briefly divided into two types. First is to record the management information as the overwrite entry which is discriminated from the defect entry as shown in FIGS. 8A, 8B and 9, and second is to record the management information as the same type as the defect entry as shown in FIGS. 10 to 12. In the former, the two kinds of entries are discriminated from each other even through a sorting, but in the latter, the two kinds of entries are mixed through the sorting.

Hereinafter, the method of recording management information according to the present invention will be explained in detail.

FIG. 7 illustrates a method of recording management information on an optical disc write once when the replacement recording is performed by the overwrite request according to an embodiment of the present invention. FIGS. 8A and 8B illustrate the recording of positional information of the area where overwrite is requested, positional information of the replacement-recorded area, and size information of the overwrite as the management information.

In the present invention, for example, for the compatibility with the BD-RE, the management information is recorded as the entry having a size of 8 bytes in the area where the defect entry is recorded. Accordingly, the management information is recorded by applying four fields, which are the same as those of the defect entry. However, the management information due to overwrite is called the overwrite entry in distinction from the defect entry, and an ID information is used in the entry for discrimination.

The overwrite entry of FIG. 7 will be explained in detail. First, the type information, which is not used in the existing BD-RE, is used in the 'status1' field. For example, if it is confirmed that '1100b' is used and the entry confirms the use of '1100b', the system recognizes it as the 'overwrite entry'. That is, the 'status1' field value, which is not used in the BD-RE, is used to discriminate the overwrite entry from the defect entry. In the 'defective cluster first PSN' field, start address information (e.g., A address) of the area, where overwrite is requested, is recorded. In the 'replacement cluster first PSN' field, start address information (e.g., C address) of the replacement-recorded area in the data area is recorded. It is possible to express such address information as the first PSN of the start cluster of the corresponding area. In the 'status2' field, the size information, with which overwrite is requested, is recorded. However, the 'status2' field is composed of 4 bits, and if the size of the area where the overwrite is requested exceeds 16 clusters, it cannot sufficiently express the size of the area. Thus, if clusters the number of which is less than 16 clusters is to be overwritten, the size information size_1 is recorded in the 'status2' field (case 1), but if the size exceeds 16 clusters, the size information size_1 is recorded in the 'defective cluster first PSN' field and in the 'replacement cluster first PSN' field, respectively, or it is recorded in either of the fields, and '0000b' is recorded in the 'status2' field (case 2).

Accordingly, if the 'status1' field is '1100b', the system recognizes the overwrite entry, and if the 'status2' field is '0000b', the system recognizes that the size exceeds 16 clusters and the size information is indicated by the consecutive entries. If the 'status2' field has a value different from '0000b', the system recognizes that the clusters as large as the value obtained by converting the corresponding digital value into a decimal number corresponds to the size information with which the overwrite is requested. By recognizing the start address and the size information, the end address of the corresponding area can be naturally confirmed.

FIG. 7 illustrates only the case that the replacement-recorded area is in front of the OSA. However, as shown in FIGS. 3, 4A, 4B and 5, the replacement-recorded area may follow the recording area (FIG. 3), may be in the spare area (FIG. 4), or may be in a separate OWA (FIG. 5).

FIG. 8A schematically illustrates the structure of the TDFL. In the TDFL, the defect entries and the overwrite entries are separately recorded. This is the result of sorting the entries based on the 'status1' information. Also, the TDFL-header of the TDFL additionally has information on the number of defect entries and the overwrite entries, and thus the information of the entries recorded in the corresponding TDFL can be obtained.

FIG. 8B illustrate a table of entry types discussed in FIG. 7. In the table, the defect entry and the overwrite entry are discriminated by the 'status1' field. Also, the overwrite entry is divided into a case of having one entry and a case of having two entries in accordance with the 'status2' field value. If 'status2=0000b ', it corresponds to two entries, and the size information can be obtained through the following entry. If 'status2=others except for 0000b', the corresponding value directly means the size information.

FIGS. 9 and 10 illustrate methods of recording management information on an optical disc write once according to other embodiments of the present invention. FIGS. 9 and 10 show the case that if the overwrite is requested, the management information on the replacement recording is processed as the same type as the existing defect entry. That is, the management information is recorded under the assumption that the replacement recording by the overwrite request is the same as the replacement recording due to the defect area. In this case, it is more preferable to discriminate whether the number of replacement-recorded recording units is singular or plural (in the case of the BD-WO, cluster) than to discriminate whether the replacement recording is due to the overwrite or the defect area.

That is, according to this embodiment, the plural clusters are replacement-recorded in another area by a certain cause, and the management information for managing this is expressed in distinction from the management information in the case that one recording unit is replacement-recorded. Accordingly, the reason why the plural clusters are replacement-recorded may be the overwriting according to the present invention, or the plural defect areas produced in the consecutive recording units. In the present invention, the replacement recording of the consecutive plural clusters is called a 'block linear replacement' or simply a 'block replacement'. On the contrary, the replacement recording of one cluster is called a '1 cluster linear replacement' or simply a '1 cluster replacement'.

According to the methods illustrated in FIGS. 9 and 10, if the overwrite of a specified area (e.g., A-B area) of the disc is requested by the user or consecutive defects are produced in all the corresponding areas, the corresponding data is replacement-recorded in the C-D area of the spare area, and its management information is recorded. Even if the replacement recording is performed in another data area except for the spare area in the case of the overwrite as shown in FIGS. 2, 3, 4A, 4B and 5, the management information recording method according to the invention can be applied as it is.

In FIGS. 9 and 10, the defect entry is divided into two kinds. First is the entry (1 cluster replacement) in the case that one recording unit is replacement-recorded, and second is the entry (block replacement) in the case that the plural recording units are replacement-recorded. That is, the management information recording method of FIGS. 9 and 10 records the management information by discriminating whether the replacement recording unit is '1 cluster' or 'block', and it is assumed that the overwrite request or the defect area is produced in the unit of '1 cluster, or block'.

Also, referring to FIGS. 9 and 10, the defect entry is divided according to whether the size information is used as the management information. FIG. 9 illustrates the case that the size information is used, and FIG. 10 illustrates the case that the size information is not used.

First, in FIG. 9, in the case of the '1 cluster replacement', the management information is recorded in the same manner as in FIG. 7. In the case of the 'block replacement', the 'status1' field has '0000b' in the same manner as the case of the '1 cluster replacement'. The sorting is applied whenever the defect entry is recorded in the TDFL. The first basis of the sorting is the 'status1' field, and the next is the 'defective cluster first PSN' field. Accordingly, if the replacement recording is normally performed, the '1 cluster replacement' and the 'block replacement' have the same 'status1=0000b', and thus in the same 'status1', the sorting is performed by the 'defective cluster first PSN' field. This is why the 'status1' field has '0000b' both in the case of the 'block replacement' and in the case of the '1 cluster replacement'. This feature will be explained in detail with reference to FIG. 12.

Accordingly, the discrimination between the case of the '1 cluster replacement' and the case of the 'block replacement' is performed using the 'status2' field. That is, in the case of the '1 cluster replacement', 'status2=0000b', but in the case of the 'block replacement', 'status2=0001b or 1001b'. Here, in the case of the 'block replacement', it has two consecutive entries. If 'status2=0001b', the entry will be the first leading entry, and if 'status=1001b', the entry will be the second following entry. The first entry, which is 'status2=0002b', has the original start address of the original area to be replaced and a replacement start address of the replacement-recorded area. The second entry, which is 'status2=0001b or 1001b', has the size information size_1 of the area to be replaced.

FIG. 9 shows the recording of 'sttus2=0001b or 1001b' in the case of the block replacement according to an embodiment of the present invention, and it is natural that any other information which is discriminated from 'status=0000b' can be used. For example, in the case of the block replacement, the same result can be obtained even if it is set that 'status2=0011b or 1011b'.

FIG. 10 illustrates the case that the second entry of FIG. 9 has the original end address of the original area and the replacement end address of the replacement-recorded area instead of the size information used in the second entry of FIG. 9. Other parts are the same as those in FIG. 9.

FIG. 11A schematically illustrates the entry being recorded in the TDFL as the management information in recording the management information on the optical disc write once according to the present invention. All the entries are managed as the same defect entries (in fact, both the replacement recording due to the overwrite and the replacement recording due to the defect area have the same 'status1=0000b', and this is called the defect entry). In the TDFL header, information, which indicates the number of defect entries for each kind, is placed. Here, the entry in the case of the 'block replacement' may be called a BRAD (Block RAD) or a CDA (Consecutive Defective Area). This is to indicate that in the case of the 'block replacement', the block RAD is the same as that in the case of the '1 cluster replacement', which is normally replacement-recorded, but the replacement recording is performed in the unit of a block, not in the unit of a cluster.

FIG. 11B illustrates a table showing the entry-type relation as described with reference to FIGS. 9 and 10. As shown in the table, in the case of the '1 cluster replacement', the entry has 'status2=0000b', and in the case of the 'block replacement', the entry has 'status 2=0001b or 1001b'. Also, in the case that the replacement recording is normally completed, the entry has 'status1=0001b' (NRD or BNRD). By extension in this manner, the table will be able to be applied to any type entry.

FIG. 12 illustrates a method of updating the TDFL in the management information recording method as shown in FIGS. 9, 10, 11A and 11B, and especially shows the management information recording method in the case that the sorting is applied.

First, under the assumption that the TDFL was recorded as TDFL#K by 5 '1-cluster-replacements', 6 consecutive clusters including defective areas which correspond to the defect entries 3, 4 and 5 have been replacement-recorded as the 'block replacement'. At this time, a new entry will be recorded at the update time of the TDFK#K+1, and since the defect entries 3, 4 and 5 recorded in the previous TDFL#K includes in the 'block replacement' area in the TDFL#K+1, they require no further management and thus are omitted in the TDFL#K+1. That is, since the defect entries 3, 4 and 5 can be expressed as a new BRAD type entry, they are not recorded as the management information in the TDFL#K+1. Accordingly, the number of final entries of the TDFL#K+1 will be three, and the three entries are first aligned based on the 'status1' information by sorting, and then aligned in the order of positions of their original areas before the replacement. By applying this to the case of FIG. 12, all the entry types RAD or BRAD have the same 'status1=0000b' in TDFL#K+1, and thus the entries are aligned in the order of PSNs (Physical Sector Numbers) of the replaced original areas, which is the second basis of sorting. By doing so, the number of defect entries produced due to the 'block replacement' can be reduced, and this makes it possible to efficiently use the management area of the optical disc write once.

Figure 13:
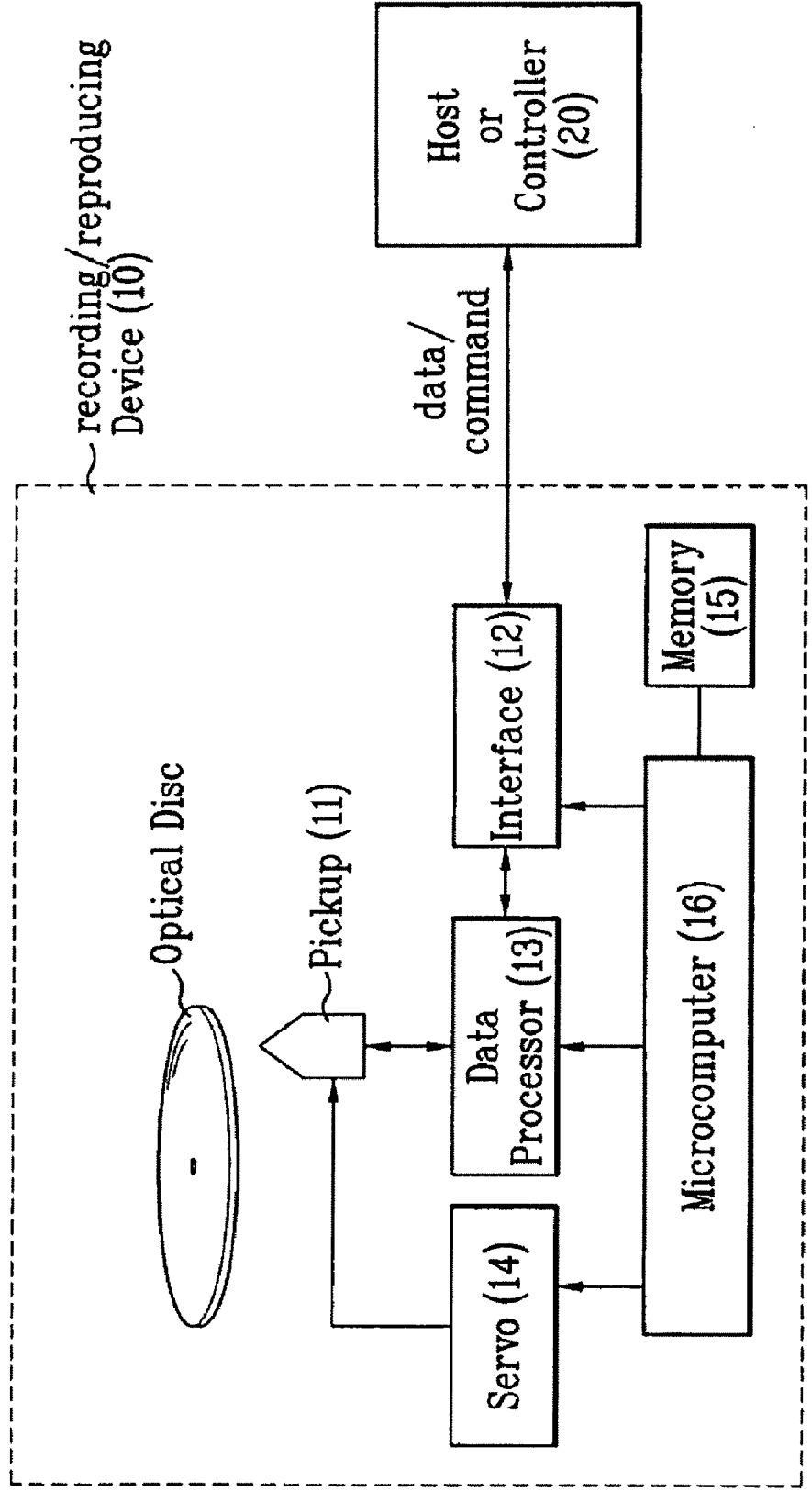
FIG. 13 illustrates a device for recording/reproducing an optical disc write once according to the present invention.

FIG. 13 illustrates an apparatus for recording/reproducing an optical disc write once according to the present invention.

The recording/reproducing apparatus includes a recording/reproducing device for performing the recording/reproducing on the optical disc, and a host or controller for controlling the device. The controller for providing a recording/reproducing command to the recording/reproducing device, and the recording/reproducing device performs the recording/reproducing on a specified area of the disc according to the command of the controller. The recording/reproducing device 10 comprises an interface 12 for performing a communication with the outside, an optical pickup 11 for recording or reproducing data on the disc, a data processor 13 for receiving the reproduced signal from the optical pickup to restore to a desired signal value, or modulating the signal to be recorded to a signal which can be recorded on the disc to transfer the modulated signal, a servo unit 14 for controlling the optical pickup 11 in order to accurately read the signal from the optical disc or to accurately write the signal on the disc, a memory 15 for temporarily storing various information including the management information and data, and a microcomputer 16 for controlling constituent elements of the recording/reproducing device.

During the recording operation, all the management information of the disc is read out and stored in the memory 15 of the recording/reproducing device, and the management information is used for the recording/reproducing operation on the optical disc. The controller 20, if it is required to record data in a specified area of the disc, transfers the positional information to the recording/reproducing device along with the data to be recorded. The microcomputer 16 in the recording/reproducing device 10 receives the recording command, and judges whether the area of the optical disc in which the controller 20 desires to record data is an already recorded area or a non-recorded area from the management information stored in the memory 15. If it is judged that the area is the non-recorded area, the microcomputer 16 performs the recording in accordance with the recording command of the controller 20, and if it is judged that the area is the already recorded area, the microcomputer 16 replacement-records the data in another area of the data area. Accordingly, the microcomputer 16 transfers the positional information of the replacement-recorded area and the data to the server unit 14 and the data processor 13, so that the replacement recording can be performed at the desired position in the disc through the optical pickup 11.

During the reproducing operation, all the management information of the disc is read out and stored in the memory 15 of the recording/reproducing device, and the management information is used for the recording/reproducing operation on the optical disc. The controller 20, if it is required to reproduce data recorded in a specified area of the disc, transfers the positional information to the recording/reproducing device. The microcomputer 16 in the recording/reproducing device 10 receives the reproducing command, and judges whether the data has been replacement-recorded in another area of the data area. This can be confirmed using the defect entry or the overwrite entry recorded in the TDFL as described above. Accordingly, if the area desired to be reproduced is not the replaced area, the controller reproduces the corresponding area, and transmits the reproduced information to the controller 20. If the data has been replacement-recorded in another area, the microcomputer reproduces the corresponding replacement-recorded area, and transmits the reproduced information to the controller 20.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. An apparatus for recording data onto a write once recording medium, the recording medium having a data area and a management area, the data area having a spare area, the apparatus comprising:
    a pickup configured to record the data onto the recording medium; and
    a microcomputer configured to control the pickup,
    wherein the microcomputer is further configured to perform a replacement-recording by controlling the pickup to record data requested to be recorded in a specified area onto a replacement area in the data area when the specified area is defective or contains data recorded thereon;
    wherein the microcomputer is further configured to control the pickup to record onto the management area a pair of consecutive entries for managing the replacement-recording when a size of the specified area corresponds to a plurality of consecutive recording-units, and
    wherein one of the pair of consecutive entries indicates a start position of the specified area and a start position of the replacement area,
    wherein another one of the pair of consecutive entries indicates an end position of the specified area and an end position of the replacement area, and
    wherein each of the pair of consecutive entries includes first status information indicating that the replacement-recording is performed and second status information indicating that the replacement-recording is performed for a plurality of consecutive recording-units.

2. The apparatus of claim 1,
    wherein the microcomputer is configured to control the pickup to record onto the management area a single entry for managing the replacement-recording when the size of the specified area corresponds to one recording-unit, and
    wherein the single entry includes first status information indicating that the replacement- recording is performed.

3. The apparatus of claim 2, wherein the first status information in the pair of consecutive entries has the same value as that of the single entry being recorded when the size of the specified area corresponds to the one recording-unit.

4. The apparatus of claim 3, wherein the single entry contains second status information indicating that the size of the specified area corresponds to the one recording-unit.

5. The apparatus of claim 4, wherein each recording-unit has a size of one cluster.

6. The apparatus of claim 5, further comprising:
    a data processor configured to process a signal read/recorded from/onto the pickup; and
    a servo configured to control the pickup to record/read the signal to/from the recording medium,
    wherein the microcomputer is configured to further control the data processor and the servo,
    wherein the microcomputer is configured to transfer, to the data processor and the servo, position information of the replacement area and the requested data when the specific area is defective or contains data recorded thereon so that the pickup records the requested data onto the replacement area, and
    wherein the microcomputer is configured to record the pair of consecutive entries onto the management area when the size of the specified area corresponds to the plurality of consecutive recording-units, or to record the single entry onto the management area when the size of the specified area corresponds to the one recording-unit.

7. The apparatus of one of claims 6, further comprising:
a controller configured to transfer to the microcomputer a recording command requesting to record data onto the specified area,
wherein the microcomputer controls the servo and the data processor in response to the recording command from the controller.

8. An apparatus for reproducing data from a write once recording medium, the recording medium having a data area and a management area, the data area having a spare area, the apparatus comprising:
a pickup configured to reproduce the data from the recording medium; and
a microcomputer configured to control the pickup,
wherein the microcomputer is further configured to control the pickup to reproduce the data from a replacement area in place of a specified area requested by a reproducing command,
wherein the microcomputer is further configured to control the pickup to reproduce the data from the replacement area based on a pair of consecutive entries for managing the specified area when a size of the specified area corresponds to a plurality of consecutive recording-units, and
wherein one of the pair of consecutive entries indicates a start position of the specified area and a start position of the replacement area,
wherein another one of the pair of consecutive entries indicates an end position of the specified area and an end position of the replacement area, and
wherein each of the pair of consecutive entries includes first status information indicating that a replacement-recording is performed and second status information indicating that the replacement-recording is performed for a plurality of consecutive recording-units.

9. The apparatus of claim 8,
wherein the microcomputer is further configured to control the pickup to reproduce data from the replacement area based on a single entry for managing the specified area when the size of the specified area corresponds to one recording-unit, and
wherein the single entry includes first status information indicating that a replacement- recording for the specified area is performed and status information indicating that the size of the specified area corresponds to the one recording-unit.

10. The apparatus of claim 9, wherein the first status information in the pair of consecutive entries has a common value as a value of the single entry being recorded when the size of the specified area corresponds to the one recording-unit.

11. The apparatus of claim 10, further comprising:
a data processor configured to process a signal read from the pickup; and
a servo configured to control the pickup to accurately read the signal from the recording medium,
wherein the microcomputer is configured to control the data processor and the servo,
wherein the microcomputer is configured to transfer, to the data processor and the servo, position information of the replacement area having replaced the specified area based on the pair of consecutive entries when the size of the specified area corresponds to the plurality of consecutive recording-units so that the pickup reproduces data from the replacement area in place of the specified area, or to transfer, to the data processor and the servo, position information of the replacement area having replaced the specified area based on the single entry when the size of the specified area corresponds to the one recording-unit so that the pickup reproduces data from the replacement area in place of the specified area.

12. The apparatus of claim 11, further comprising:
a controller configured to transfer to the microcomputer the reproducing command requesting to reproduce data from the specified area,
wherein the microcomputer is configured to control the servo and the data processor in response to the reproducing command from the controller.

13. A method of recording data onto a write once recording medium, the recording medium having a data area and a management area, the data area having a spare area, the method comprising:
performing a replacement-recording by recording data requested to be recorded in a specified area onto a replacement area in the data area when the specified area is defective or contains data recorded thereon; and
recording onto the management area a pair of consecutive entries for managing the replacement-recording when a size of the specified area corresponds to a plurality of consecutive recording-units,
wherein one of the pair of consecutive entries indicates a start position of the specified area and a start position of the replacement area,
wherein another one of the pair of consecutive entries indicates an end position of the specified area and an end position of the replacement area, and
wherein each of the pair of consecutive entries includes first status information indicating that the replacement-recording is performed and second status information indicating that the replacement-recording is performed for a plurality of consecutive recording-units.

14. A method of reproducing data from a write once recording medium, the recording medium having a data area and a management area, the data area having a spare area, the method comprising:
reproducing data from a replacement area in place of a specific area requested by a reproducing command; and
reproducing data from the replacement area based on a pair of consecutive entries for managing the specified area when a size of the specified area corresponds to a plurality of consecutive recording-units,
wherein one of the pair of consecutive entries indicates a start position of the specified area and a start position of the replacement area,
wherein another one of the pair of consecutive entries indicates an end position of the specified area and an end position of the replacement area, and
wherein each of the pair of consecutive entries includes first status information indicating that a replacement-recording is performed and second status information indicating that the replacement-recording is performed for a plurality of consecutive recording-units.

15. A write once recording medium, comprising:
a data area including a spare area, the data area having an area usable as a replacement area onto which data requested to be recorded in a specified area is to be recorded when the specified area is defective or contains data recorded thereon; and
a management area for storing a pair of consecutive entries for managing the replacement area replacing the specified area when a size of the specified area corresponds to a plurality of consecutive recording-units,
wherein one of the pair of consecutive entries indicates a start position of the specified area and a start position of the replacement area,
wherein another one of the pair of consecutive entries indicates an end position of the specified area and an end position of the replacement area, and
wherein each of the pair of consecutive entries includes first status information indicating that a replacement-recording is performed and second status information indicating that the replacement-recording is performed for a plurality of consecutive recording-units.

* * * * *